United States Patent
Sun et al.

(10) Patent No.: US 10,660,020 B2
(45) Date of Patent: May 19, 2020

(54) SEARCH SPACE SET COMBINING AND DROPPING

(71) Applicant: QUALCOMM Incorporated, San Diego, CA (US)

(72) Inventors: Jing Sun, San Diego, CA (US); Heechoon Lee, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/215,330

(22) Filed: Dec. 10, 2018

(65) Prior Publication Data

US 2019/0191360 A1 Jun. 20, 2019

Related U.S. Application Data

(60) Provisional application No. 62/608,447, filed on Dec. 20, 2017.

(51) Int. Cl.
*H04W 48/12* (2009.01)
*H04L 5/00* (2006.01)

(52) U.S. Cl.
CPC ........... *H04W 48/12* (2013.01); *H04L 5/0051* (2013.01); *H04L 5/0053* (2013.01); *H04L 5/0094* (2013.01)

(58) Field of Classification Search
CPC ........... H04W 72/042; H04W 72/0446; H04W 72/0406; H04W 48/12; H04W 72/1289; H04W 72/02; H04W 72/04; H04W 74/0833; H04W 88/08; H04W 24/02; H04W 4/70; H04W 88/02; H04W 28/06; H04W 52/288; H04W 52/367;
(Continued)

(56) References Cited

U.S. PATENT DOCUMENTS

| 2012/0063401 A1* | 3/2012 | Xue | H04L 5/001 370/329 |
| 2012/0155316 A1* | 6/2012 | Li | H04W 48/16 370/252 |

(Continued)

OTHER PUBLICATIONS

Huawei et al., "Search Space Design", 3GPP Draft, R1-1709952, 3rd Generation Partnership Project (3GPP), vol. RAN WG1 , No. Qingdao, China, Jun. 27, 2017-Jun. 30, 2017, Jun. 26, 2017 (Jun. 26, 2017), XP051299177, 6 Pages, Retrieved from the Internet:URL:http://www.3gpp.org/ftp/Meetings_3GPP_SYNC/RAN1/Docs/ [retrieved on Jun. 26, 2017], Sections 2.1, 2.2, 2.3.

(Continued)

*Primary Examiner* — Daniel Lai
(74) *Attorney, Agent, or Firm* — Holland & Hart LLP

(57) ABSTRACT

Methods, systems, and devices for wireless communications are described. A number of blind decodings of a search space set for control information are defined. A search space of the search space set includes a subset of blind decodings. A reduction factor is determined. The reduction factor is applied to the subset of blind decodings to obtain a reduced subset of blind decodings for the search space. A reduced number of blind decodings of the search space set is identified based at least in part on the reduced subset of blind decodings for the search space. The control information is transmitted in a decoding candidate of the reduced number of blind decodings of the search space.

28 Claims, 15 Drawing Sheets

(58) Field of Classification Search
CPC ..... H04W 72/12; H04W 72/14; H04W 74/02;
H04W 52/0229; H04W 56/001; H04W
72/005; H04W 72/048; H04W 74/006;
H04W 28/0289; H04W 52/0209; H04W
52/0216; H04W 52/0274; H04W 52/281;
H04W 72/1278; H04W 74/008; H04W
74/0875; H04W 76/28; H04L 1/0038;
H04L 5/0023; H04L 1/0053; H04L
2027/0097; H04L 25/021; H04L 25/0238;
H04L 25/024; H04L 27/2657; H04L
27/2676; H04L 27/2695; H04L 41/0806;
H04L 5/0053; H04L 5/0051
See application file for complete search history.

(56) References Cited

U.S. PATENT DOCUMENTS

2014/0185508 A1* 7/2014 Suda ............... H04W 48/16
370/311
2018/0191454 A1* 7/2018 Furuskog ............. H04L 5/0053
2019/0089486 A1* 3/2019 Kim ..................... H04L 1/0071
2019/0150073 A1* 5/2019 Tiirola ................. H04W 48/16
455/434

OTHER PUBLICATIONS

Partial International Search Report—PCT/US2018/064896—ISA/EPO—Mar. 27, 2019 (181194WO).
Samsung: "On UE Power Savings", 3GPP Draft, R1-1720324 On UE Power Savings, 3rd Generation Partnership Project (3GPP), vol. RAN WG1, No. Reno, USA, Nov. 27, 2017-Dec. 1, 2017, Nov. 18, 2017 (Nov. 18, 2017), XP051369913, pp. 1-5, Retrieved from the Internet: URL:http://www.3gpp.org/ftp/tsg%5Fran/WG1%5FRL1/TSGR1%5F91/Docs/ [retrieved on Nov. 18, 2017], Sections 3, 3.1, 3.2, 3.3, 3.4.
International Search Report and Written Opinion—PCT/US2018/064896—ISA/EPO—May 23, 2019 (181194WO).

* cited by examiner

Control Resource Set 215-a

Busy Control Resource Set 215-b

|  | Search Space Set 405 (Aggregation Level 4) |
|  | Search Space Set 410 (Aggregation Level 4) |

SEARCH SPACE SET COMBINING AND DROPPING

CROSS REFERENCES

The present Application for Patent claims the benefit of U.S. Provisional Patent Application No. 62/608,447 by Sun et al., entitled "SEARCH SPACE SET COMBINING AND DROPPING," filed Dec. 20, 2017, assigned to the assignee hereof, and expressly incorporated by reference herein.

BACKGROUND

The present disclosure relates generally to wireless communication, and more specifically to search space set combining and dropping.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station may configure a search space of physical downlink control channel (PDCCH) candidates to carry downlink control information (DCI) to a user equipment (UE). In some cases, the base station may configure multiple PDCCH candidates for the UE to search, and the UE may perform several blind decodings to receive scheduled DCI. However, there may be a limit or maximum number of blind decodings which the UE can perform in a single slot. If the number of PDCCH candidates exceeds the limit, the UE may not receive each scheduled DCI.

SUMMARY

A base station may configure a search space set for transmission of downlink control information (DCI) to a user equipment (UE). The search space set may include a number of blind decodings at multiple aggregation levels, on which the base station can schedule DCI transmissions. In some cases, the base station may configure multiple search space sets for transmission of DCI to the UE, where each search space set corresponds to a different DCI format. The UE may have a maximum number or limit of blind decodings it can perform in a slot, and the base station may implement techniques to reduce the number of blind decodings in the slot. In some cases, the base station may reduce the number of blind decodings in each search space set. The base station may keep at least one blind decoding for each search space set or each aggregation level of each search space set. Thus, the base station may still schedule DCI corresponding to the DCI format of the search space set. In some cases, the base station may determine the total number of blind decodings in a slot based on the number of blind decodings for each search space set in each control resource set in the slot. The base station may determine a reduction factor based on the total number of scheduled blind decodings and the blind decoding limit. The base station may reduce the number of blind decodings per search space set such that the total number of blind decodings is less than the blind decoding limit. In some cases the base station may prune (e.g., remove blind decodings from) a search space set based on a priority of the DCI format associated with the search space set. The base station may assign a high priority to the common search space and a lower priority to UE-specific search spaces. Thus, the base station may not prune the common search space and instead lower the total number of blind decodings by removing them from UE-specific search spaces.

The base station may then perform a hash function on each search space set. In some cases, the base station may independently hash blind decodings of search space sets with common aggregation levels. If two search space sets each have blind decodings for an aggregation level, the hashed aggregation levels may have overlapping or colliding decoding candidates. In some cases, the UE may still be scheduled for both DCI formats in the decoding candidates, though the base station may have less flexibility in scheduling the DCI due to fewer distinct decoding candidates. In some other examples, the base station may combine the search space sets before performing the hashing function. For example, if an aggregation level of a first search space set has four blind decodings, and the same aggregation level of a second search space set has two blind decodings, the base station may perform a hashing function for six blind decodings instead of performing a hashing function for both four blind decodings then two blind decodings. The base station may then assign decoding candidates to the search space sets (e.g., four candidates to the first search space set and two candidates to the second search space set).

A method of wireless communication is described. The method may include identifying a number of blind decodings of a search space set for control information, where a search space of the search space set includes a subset of blind decodings, determining a reduction factor, applying the reduction factor to the subset of blind decodings to obtain a reduced subset of blind decodings for the search space, identifying a reduced number of blind decodings of the search space set based on the reduced subset of blind decodings for the search space, and transmitting the control information in a decoding candidate of the reduced number of blind decodings of the search space.

An apparatus for wireless communication is described. The apparatus may include a processor, memory in electronic communication with the processor, and instructions stored in the memory. The instructions may be executable by the processor to cause the apparatus to identify a number of blind decodings of a search space set for control information, where a search space of the search space set includes a subset of blind decodings, determine a reduction factor, apply the reduction factor to the subset of blind decodings to obtain a reduced subset of blind decodings for the search space, identify a reduced number of blind decodings of the search space set based on the reduced subset of blind decodings for the search space, and transmit the control information in a decoding candidate of the reduced number of blind decodings of the search space.

Another apparatus for wireless communication is described. The apparatus may include means for identifying a number of blind decodings of a search space set for control information, where a search space of the search space set includes a subset of blind decodings, determining a reduction factor, applying the reduction factor to the subset of blind decodings to obtain a reduced subset of blind decodings for the search space, identifying a reduced number of blind decodings of the search space set based on the reduced subset of blind decodings for the search space, and transmitting the control information in a decoding candidate of the reduced number of blind decodings of the search space.

A non-transitory computer-readable medium storing code for wireless communication is described. The code may include instructions executable by a processor to identify a number of blind decodings of a search space set for control information, where a search space of the search space set includes a subset of blind decodings, determine a reduction factor, apply the reduction factor to the subset of blind decodings to obtain a reduced subset of blind decodings for the search space, identify a reduced number of blind decodings of the search space set based on the reduced subset of blind decodings for the search space, and transmit the control information in a decoding candidate of the reduced number of blind decodings of the search space.

In some examples of the method, apparatuses, and non-transitory computer-readable medium described herein, the reduction factor may be 0 when the subset of blind decodings may be equal to the reduced subset of blind decodings for the search space, or the reduction factor may be 1 when the reduced subset of blind decodings for the search space may be completely reduced.

In some examples of the method, apparatuses, and non-transitory computer-readable medium described herein, determining the reduction factor further may include operations, features, means, or instructions for identifying the blind decoding limit for a slot, identifying a number of blind decodings for each search space set in the slot and determining the reduction factor based on the blind decoding limit and the number of blind decodings for each search space set in the slot.

In some examples of the method, apparatuses, and non-transitory computer-readable medium described herein, the blind decoding limit may be based on a UE capability.

In some examples of the method, apparatuses, and non-transitory computer-readable medium described herein, identifying the number of blind decodings of the search space set further may include operations, features, means, or instructions for identifying the number of blind decodings for each aggregation level of the search space set.

In some examples of the method, apparatuses, and non-transitory computer-readable medium described herein, the search space may be associated with an aggregation level of the search space set.

In some examples of the method, apparatuses, and non-transitory computer-readable medium described herein, the reduced subset of blind decodings for the search space includes at least one blind decoding.

Some examples of the method, apparatuses, and non-transitory computer-readable medium described herein may further include operations, features, means, or instructions for determining a priority of the search space set, where the reduction factor may be determined based on the priority of the search space set.

In some examples of the method, apparatuses, and non-transitory computer-readable medium described herein, the priority of a common search space may be higher than the priority of a UE-specific search space.

In some examples of the method, apparatuses, and non-transitory computer-readable medium described herein, the reduction factor of the common search space may be 0.

In some examples of the method, apparatuses, and non-transitory computer-readable medium described herein, the priority of the search space may be configured by RRC signaling.

In some examples of the method, apparatuses, and non-transitory computer-readable medium described herein, the priority of the search space set may be associated with a type of information carried by DCI in the search space set.

Some examples of the method, apparatuses, and non-transitory computer-readable medium described herein may further include operations, features, means, or instructions for determining a priority of the search space based on an aggregation level of the search space, where the reduction factor may be determined based on the priority of the priority of the search space.

In some examples of the method, apparatuses, and non-transitory computer-readable medium described herein, the search space set may be a UE-specific search space set carrying DCI for a single UE.

DETAILED DESCRIPTION

Figure 1:
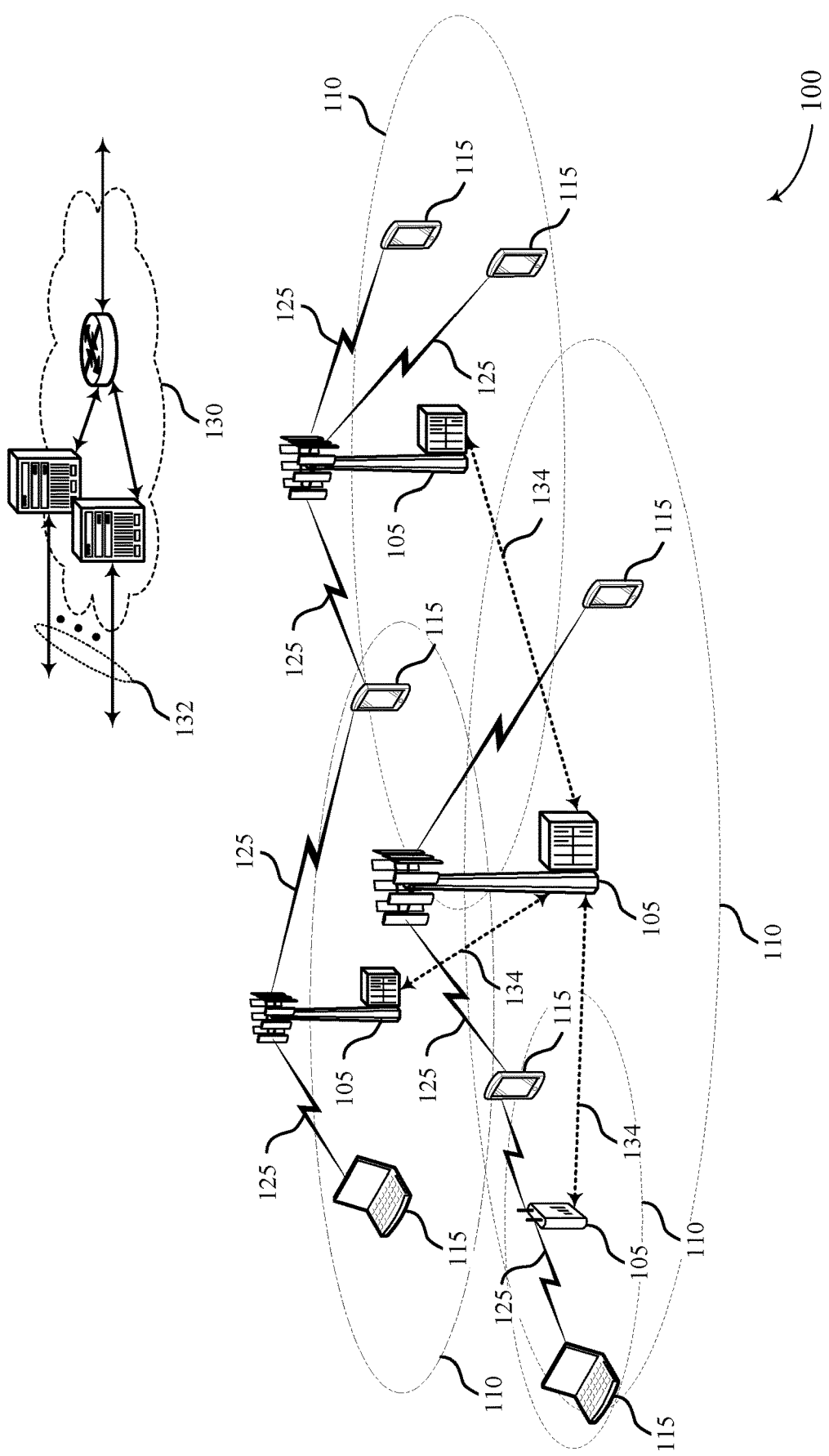
FIG. 1 illustrates an example of a system for wireless communication that supports search space set combining and dropping in accordance with aspects of the present disclosure.

A base station may configure a search space set for transmission of downlink control information (DCI) to a user equipment (UE). The search space set may correspond to one type of DCI or one DCI format. The search space set may include a number of blind decodings at multiple aggregation levels. In some cases, the base station may configure multiple search space sets for transmission of DCI to the UE, where each search space set corresponds to a different DCI format. Each search space set may include blind decodings at multiple aggregation levels, and the UE may perform several blind decodings to receive all of the DCI. However, there may be a limit or maximum number of blind decodings which the UE can perform in a single slot. In some wireless systems, the UE may drop, or not blindly decode, a search space set to reduce the number of blind decodings in the slot. However, by dropping the search space set, the UE is unable to receive DCI of the corresponding DCI format in that search space set. In some cases, the UE may receive redundant information of one DCI format while receiving no information of another DCI format, which may trigger retransmission of the dropped DCI, or the UE may miss important control information included in the dropped DCI.

Instead of dropping a search space set, the base station may prune each search space set to reduce the total number of blind decodings in the slot. Thus, the UE may still receive DCI for each DCI format corresponding to each search space set. In some cases, the base station may determine the total number of blind decodings in a slot based on the number of blind decodings for each search space set. The base station may determine a reduction factor based on the total number of blind decodings and reduce the search space sets such that the total number of blind decodings is less than the maximum number of blind decodings.

In some cases the reduction factor may consider a priority of a search space set and corresponding DCI format. For example, a search space set corresponding to important control information may be pruned less than a search space set carrying less important control information. In some other examples, individual aggregation levels of a search space set may be pruned, such that one aggregation level of a search space set is pruned more than another aggregation level of the search space set. In some cases, the base station may assign a high priority to common search spaces and a lower priority to UE-specific search spaces. Thus, the base station may not prune the common search spaces and instead lower the total number of blind decodings by removing them from UE-specific search spaces.

The base station may then perform a hash function on each aggregation level of each search space set. In some cases, the base station may independently hash search space sets. If two search space sets each have blind decodings at a certain aggregation level, the search space sets may have overlapping decoding candidates in the search space. In some cases, the UE may still be schedulable for either of the DCI formats in the overlapping decoding candidate, though the base station may have less flexibility in scheduling DCI in the search space due to fewer distinct decoding candidates. In some other examples, the base station may combine the blind decodings for the aggregation level of the different search space sets before performing the hashing function. For example, if an aggregation level of a first search space set has four blind decodings, and the same aggregation level of a second search space set has two blind decodings, the base station may perform a hashing function for six blind decodings instead of performing a hashing function for four blind decodings then two blind decodings. The base station may then assign the decoding candidates to the combined search space sets (e.g., four candidates to the first search space set and two candidates to the second search space set).

Aspects of the disclosure are initially described in the context of a wireless communications system. Aspects of the disclosure are further illustrated by and described with reference to apparatus diagrams, diagrams of search space configurations or control resource configurations, system diagrams, and flowcharts that relate to search space set combining and dropping.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHZ industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform (DFT)-spread OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communications system 100 may support techniques for search space combining and dropping as described herein. For example, a base station 105 of the wireless communications system 100 may schedule DCI for a UE 115 in multiple search space sets. In some cases, the UE 115 may have a blind decoding limit, where the UE 115 may be capable of performing a maximum number of blind decodings in a slot. The base station 105 may prune blind decodings from the search space sets such that the total number of blind decodings in a slot is less than the blind decoding limit. The base station 105 may also implement various techniques for hashing blind decodings into a search space. In a first example, the base station 105 may independently hash aggregation levels of the search space sets into a search space. In another example, the base station 105 may combine the search space sets and hash the aggregation levels of the combined search space set. The base station 105 may assign the hashed decoding candidates to the first search space set and the second search space set.

Figure 2:
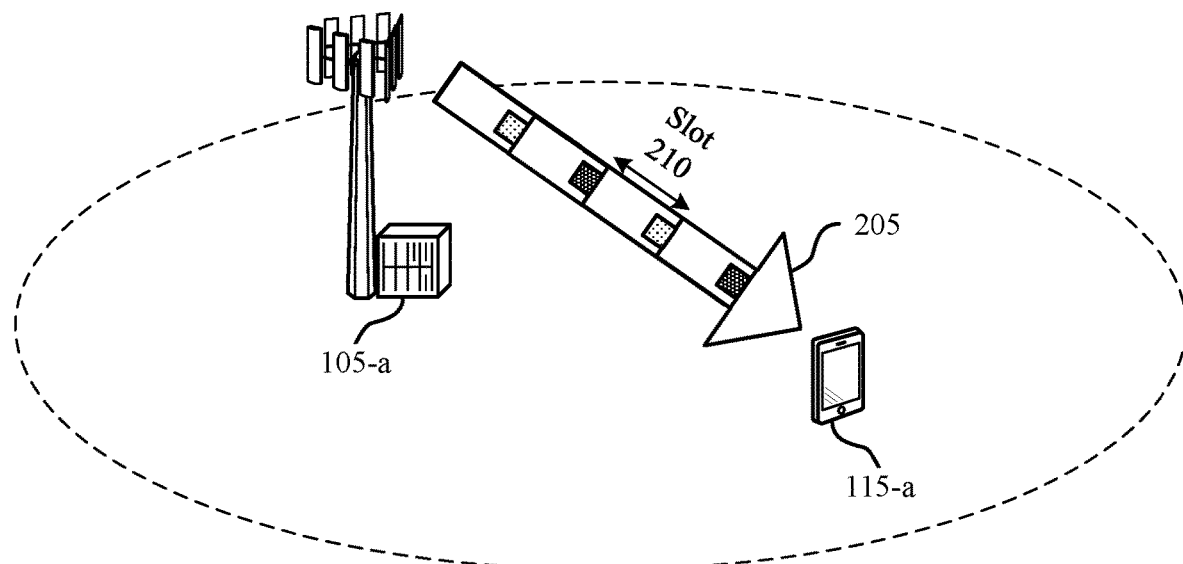
FIG. 2 illustrates an example of a wireless communications system that supports search space set combining and dropping in accordance with aspects of the present disclosure.
Figure 2:
Figure 2:
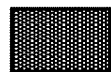

FIG. 2 illustrates an example of a wireless communications system 200 that supports search space set combining and dropping in accordance with various aspects of the present disclosure. In some examples, wireless communications system 200 may implement aspects of wireless communications system 100. Wireless communications system 200 includes UE 115-a and base station 105-a, which may be respective examples of a UE 115 and a base station 105 as described herein. Base station 105-a may transmit DCI to UE 115-a in a downlink transmission 205.

Base station 105-a may configure multiple search space sets for transmitting different formats of DCI. UE 115-a may blindly decode the decoding candidates (e.g., physical downlink control channel (PDCCH) candidates) of each search space to receive the DCI. The DCI may include downlink grants or uplink grants, among other types of DCI. Each search space set may correspond to a DCI format. For example, base station 105-a may configure a search space set to transmit uplink grants and configure another search space set to transmit data resource (e.g., physical downlink shared channel (PDSCH)) assignments. Base station 105-a may configure UE 115-a with parameters to identify the sets of search spaces by RRC signaling. For example, each set of search spaces may associate with a control resource set configuration by UE-specific RRC signaling.

A search space set may include a set of aggregation levels, each of which may form a search space with decoding candidates. For example, a search space set may include aggregation levels of 1, 2, 4, and 8. Each aggregation level may include a number of PDCCH candidates. For example, a search space set may include six decoding candidates for aggregation level 1, six decoding candidates for aggregation level 2, two decoding candidates for aggregation level 4, and two decoding candidates for aggregation level 8. The number of decoding candidates for the search space set may be notified by {6, 6, 2, 2}, where each index corresponds to an aggregation level. In some examples, a search space set may also include an aggregation level of 16.

A common search space may be supported by aggregation level 4 and aggregation level 8. The common search space is shared across multiple UEs 115 and may be used by base station 105-a to transmit common control information to served UEs 115. UE-specific search spaces may be in any of the aggregation levels. In the example search space set above (e.g., {6, 6, 2, 2}), base station 105-a may use six decoding candidates on aggregation level 1 and aggregation level 2 to transmit UE-specific control information for UE 115-a. Base station 105-a may also use two decoding candidates on aggregation level 4 and aggregation level 8 for UE-specific control information or common control information, or both.

The search space sets may be transmitted on a control resource set 215 at the beginning of a slot 210. There may be multiple control resource sets 215 configured for a single slot, and each control resource set 215 may be used for different search space sets. Search space sets may have different monitoring occasions. For example, UE 115-a may monitor for more search space sets during a busy control resource set 215-b than a control resource set 215-a. A first search space set may have a one-slot PDCCH monitoring occasion, and each control resource set 215 may have decoding candidates of the first search space set. Other examples of monitoring occasions may be once every five, ten, or twenty slots 210. A second search space set may have a two-slot PDCCH monitoring occasion such that every other slot 210 has decoding candidates for the second search space. For example, busy control resource sets 215-b may have the second search space set, but the control resource sets 215-a may not. Therefore, there may be more blind decodings performed during slots with busy control resource sets 215-b.

UE 115-a may have a limit to the number of blind decodings it can perform in a slot 210. In some slots with many blind decodings (e.g., slots containing a busy control resource set 215-b), base station 105-a may reduce the number of blind decodings in the slot 210. For example, base station 105-a may prune blind decodings from each set of search spaces in the slot 210. By shrinking or pruning each UE-specific search space instead of completely dropping them, multiple grants may still be transmitted to UE 115-a. In some examples, base station 105-a may prune UE-specific search spaces, but not the common search space. For example, base station 105-a may not prune special common search spaces for a group common PDCCH carrying a slot format indicator or a paging indicator.

In some examples, among UE-specific search spaces, base station 105-a may proportionally prune each search space set. If the search space set includes multiple aggregation levels base station 105-a may drop some blind decodings for each aggregation level. In an example, UE 115-a can perform X blind decodings in a slot 210. After removing the common search space blind decodings, UE 115-a can perform X' blind decodings in UE-specific search spaces. For the UE-specific search space k, there is a profile of $\{A_{k,1}, A_{k,2}, A_{k,4}, A_{k,8}\}$, where $\Sigma_k A_{k,1}+A_{k,2}+A_{k,4}+A_{k,8} > X'$. Base station 105-a may determine a pruned profile, $\{A'_{k,1}, A'_{k,2}, A'_{k,4}, A'_{k,8}\}$, such that $A'_{k,i} \leq A_{k,i}$ and Equation (1) is true.

$$\Sigma_k A'_{k,1}+A_{k,2}+A_{k,4}+A_{k,8} \leq X' \quad (1)$$

In some cases, base station 105-a may determine a reduction factor to proportionally prune each search space set and each aggregation level of the search space sets. For example, may define the reduction factor, $\rho$, as shown in Equation (2).

$$\rho = \frac{X'}{\sum_k A_{k,1} + A_{k,2} + A_{k,4} + A_{k,8}} \quad (2)$$

Therefore, $A'_{k,i} \cong A_{k,i} \times \rho$. In some cases, base station 105-a may introduce some rounding when determining $A'_{k,i}$, for example such that $A'_{k,i} \cong \text{floor}(A_{k,i} \times \rho)$. Base station 105-a may add 0 or 1 to an aggregation level of a search space set such that the number of blind decodings in UE-specific search spaces totals X'. Base station 105-a may add a blind decoding such that the search space set has at least one decoding candidate. Therefore, base station 105-a may still schedule DCI of the DCI format corresponding to the search space set. In some examples, each aggregation level of the search space set may have at least one blind decoding, such that base station 105-a may have more flexibility when scheduling DCI of the corresponding DCI format.

In a numerical example, if UE 115-a can perform 40 UE-specific blind decodings in a slot 210, but the current number of UE-specific search space decodings is 50, base station 105-a may remove 20%

$$\left(\text{e.g., } \frac{40}{50} = 0.8\right)$$

of blind decodings from each aggregation level of each search space set such that the total number of blind decodings in the UE-specific search space is 40 blind decodings. In some cases, base station 105-a may keep at least one blind decoding for each search space set or one blind decoding for each aggregation level of each search space set.

In another example, base station 105-a may prune search space sets based on priority. For example, base station 105-a may assign a priority number for each search space set, $\gamma_k$, and prune more from the search space set if the priority is lower. In some cases, the priority may be configured by radio resource control (RRC) signaling, or the priority may be fixed as a function of the control resource set 215. For example, a mini-slot control resource set may have a higher priority based on ultra-reliable and low latency communication (URLCC) uses. Base station 105-a may proportionally prune each search space set and each aggregation level, but prune inversely proportional to the priority parameter $\gamma_k$ for search space set k. For example, base station 105-a may determine the number of weighted blind decodings to prune as shown in Equation (3), and base station 105-a may define the reduction factor for search space set k as shown in Equation (4).

$$\Delta = X' - \sum_k (A_{k,1} + A_{k,2} + A_{k,4} + A_{k,8}) \quad (3)$$

$$\rho_{k,i} = \frac{\frac{A_{k,i}}{\gamma_k}}{\sum_k \frac{(A_{k,1} + A_{k,2} + A_{k,4} + A_{k,8})}{\gamma_k}} \quad (4)$$

Base station 105-a may then prune each aggregation level of the search space set k such that $A'_{k,i} \cong A_{k,i} - \rho_{k,i} \times \Delta$. Base station 105-a may prune the search space set such that there is at least one blind decoding in the search space set or in each aggregation level of the search space set.

In some examples, base station 105-*a* may drop blind decodings for an entire aggregation level of a search space set. Base station 105-*a* may drop aggregation level by aggregation level to meet the blind decoding limit. For example, if a higher aggregation level has a higher priority, base station 105-*a* may drop the lower aggregation levels first. In some cases, base station 105-*a* may keep at least one blind decoding per aggregation level. Base station 105-*a* may stop dropping blind decodings from aggregation levels when the blind decoding limit is reached.

Base station 105-*a* may then perform a hash function on each aggregation level of each search space set. In some cases, base station 105-*a* may independently hash the aggregation levels of each search space set. If two search space sets each have blind decodings for an aggregation layer, the hashed aggregation levels may have overlapping decoding candidates. In some cases, UE 115-*a* may still be scheduled for both DCI formats in colliding decoding candidates, though base station 105-*a* may have less flexibility in scheduling the DCI due to fewer distinct decoding candidates in the search space. In some other examples, base station 105-*a* may combine the blind decodings for an aggregation level of different search space sets before applying the hash function. For example, if an aggregation level of a first search space set has four blind decodings, and the same aggregation level of a second search space set has two blind decodings, base station 105-*a* may hash six blind decodings instead of hashing four blind decodings and then hashing two blind decodings. Base station 105-*a* may then assign the decoding candidates to the search space sets (e.g., four candidates to the first search space set and two candidates to the second search space set).

Figure 3:
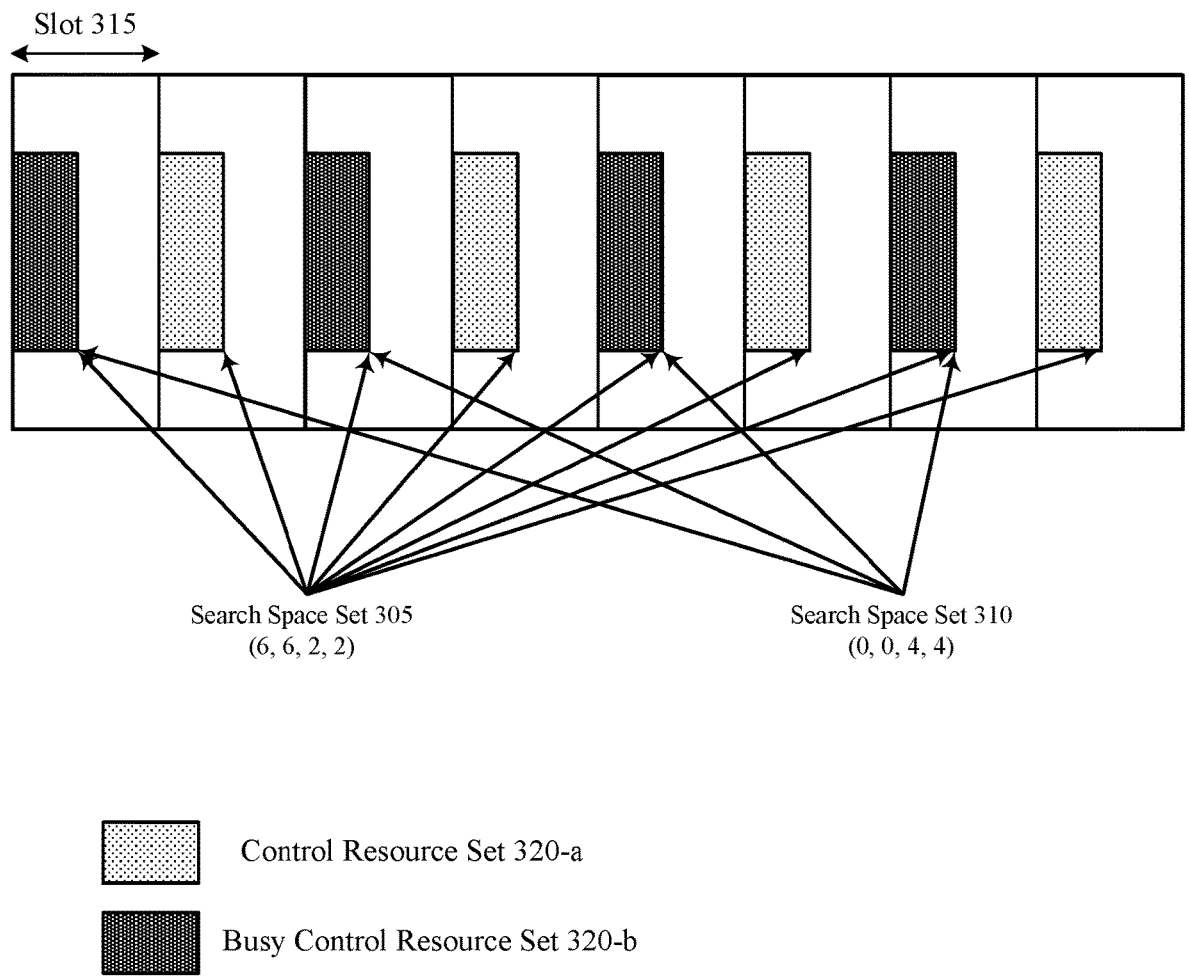
FIG. 3 illustrates an example of control resource set configurations that supports search space set combining and dropping in accordance with aspects of the present disclosure.

FIG. 3 illustrates an example of control resource set configurations 300 that supports search space set combining and dropping in accordance with various aspects of the present disclosure. In some examples, control resource set configurations 300 may implement aspects of wireless communications system 100. Control resource set configurations 300 includes multiple slots 315, each of which may include a control resource set 320-*a* or a busy control resource set 320-*b*. A UE 115 may monitor for DCI in the control resource sets 320 and blindly decode PDCCH candidates in the control resource sets 320.

A base station 105 may configure multiple search space sets for transmitting different formats of DCI. For example, the base station may configure a first search space set 305 and a second search space set 310. The base station may transmit a different format of DCI in the first search space set 305 may than the second search space set 310. Additionally, the first search space set 305 may have a different number of blind decodings per aggregation level than the second search space set 310. For example, the first search space set 305 may include six decoding candidates for aggregation level 1, six decoding candidates for aggregation level 2, two decoding candidates for aggregation level 4, and two decoding candidates for aggregation level 8. The number of decoding candidates for the first search space set 305 may be notified by {6, 6, 2, 2}, where each index corresponds to an aggregation level. Similarly, the second search space set 310 may include zero decoding candidates for aggregation level 1, zero decoding candidates for aggregation level 2, four decoding candidates for aggregation level 4, and four decoding candidates for aggregation level 8. In some examples, a set of search spaces may be determined based on a set of aggregation levels, a number of PDCCH candidates for each aggregation level, or a PDCCH monitoring occasion for the set of search spaces. In some cases, each set of search spaces may associate with a control resource set configuration by RRC signaling. In some examples, the first search space set 305, the second search space set 310, or both, may additionally have an aggregation level of 16.

The search space set configuration for the first search space set 305 may have a different monitoring occasions. Therefore, the UE may monitor for more search space sets during a busy control resource set 320-*b* than a control resource set 320-*a*. The first search space set 305 may have a one-slot PDCCH monitoring occasion, and each control resource set 320 may have decoding candidates of the first search space set 305. The second search space set 310 may have a two-slot PDCCH monitoring occasion, and the search space set may be included in every other control resource set 320 (e.g., only in busy control resource sets 320-*b*). Therefore, the number of blind decodings per control resource set 320 may be time varying, and there may be more blind decodings performed during slots with busy control resource sets 320-*b*. Other examples of monitoring occasions may be once every five slots, ten slots, or twenty slots. In some cases, a slot-level offset value for a PDCCH monitoring occasion may be supported. For an N-slot monitoring occasion, the offset may be from 0 to N−1. In some cases, there may be a symbol-level bitmap of monitoring occasions within a slot.

Figure 4:
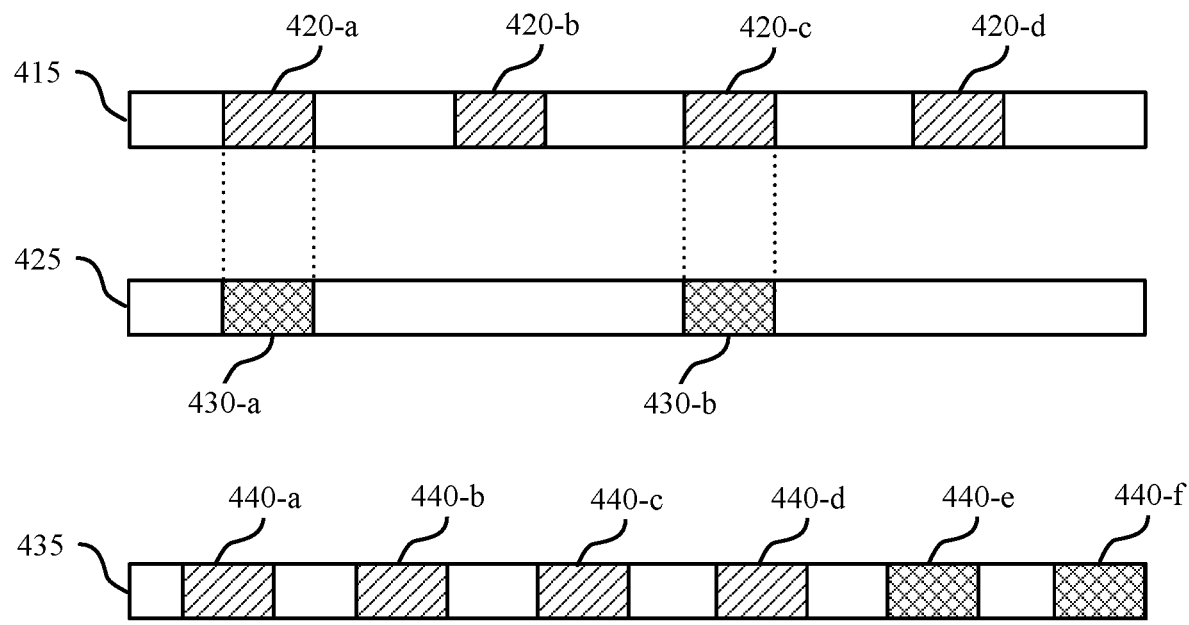
FIG. 4 illustrates an example of search space set combination that supports search space set combining and dropping in accordance with aspects of the present disclosure.
Figure 4:
Figure 4:

FIG. 4 illustrates an example of search space set combination 400 that supports search space set combining and dropping in accordance with various aspects of the present disclosure. In some examples, search space set combination 400 may implement aspects of wireless communications system 100. A base station 105 may configure multiple search space sets for one control resource set. In some cases, the total number of blind decodings for the slot containing the first search space set 405 and the second search space set 410 may be below the blind decoding limit.

The base station 105 may configure the first search space set 405 and the second search space set 410. The first search space set 405 may have a number of blind decodings for aggregation levels corresponding to {0, 0, 4, 4}, and the second search space set 410 may have a number of blind decodings for aggregation levels corresponding to {6, 6, 2, 2}. The search space set combination 400 illustrates decoding candidates of aggregation level 4, where the first search space set 405 has four blind decodings and the second search space set 410 has two blind decodings.

The base station 105 may independently hash the aggregation level 4 of the first search space set 405 and hash the aggregation level 4 of the second search space set 410. Hashing the aggregation level 4 of the first search space set 405 may generate the decoding candidate configuration 415, including decoding candidates 420-*a*, 420-*b*, 420-*c*, and 420-*d*. The base station 105 may uniformly hash the decoding candidates 420 into the search space. Hashing the aggregation level 4 of the second search space set 410 may generate the decoding candidate configuration 425, including decoding candidates 430-*a* and 430-*b*. In some cases, decoding candidate 420-*a* may overlap with decoding candidate 430-*a* in the search space, and decoding candidate 420-*c* may overlap with decoding candidate 430-*b*. Thus, by independently hashing the search space sets, the base station 105 may have four decoding candidates to schedule DCI.

In some examples, the first decoding candidate of the decoding candidate configuration 415 or the decoding candidate configuration 425 may have a different initial position. For example, decoding candidate 420-*a* and decoding candidate 430-*a* may not completely overlap in the search space. The initial position of a decoding candidate may be based on a random number or a function of a UE index of the UE 115 associated with the search space set.

In some cases, the base station 105 may combine the search space sets before hashing. For example, the base station 105 may combine the first search space set 405 (e.g., with a configuration of {0, 0, 4, 4}) and the second search space set 410 (e.g., with a configuration of {6, 6, 2, 2}) into a third search space set with a search space set configuration of {6, 6, 6, 6}. Thus, if aggregation level 4 of the first search space set 405 has four blind decodings, and aggregation level 4 of the second search space set 410 has two blind decodings, the aggregation level 4 of a combined search space set may have six blind decodings. Thus, the base station 105 may hash six decoding candidates into the search space. Hashing the six decoding candidates is illustrated by the decoding candidate configuration 435. The base station may assign the first four decoding candidates 440 (e.g., decoding candidate 440-*a*, 440-*b*, 440-*c*, and 440-*d*) to the first search space set 405 and assign the last two decoding candidates 440 (e.g., decoding candidate 440-*e* and 440-*f*) to the second search space set 410. By combining the search space sets then hashing, there may be less overlap or blocking of decoding candidates. In some cases, the base station 105 may not combine the common search space and UE-specific search spaces.

Figure 5:
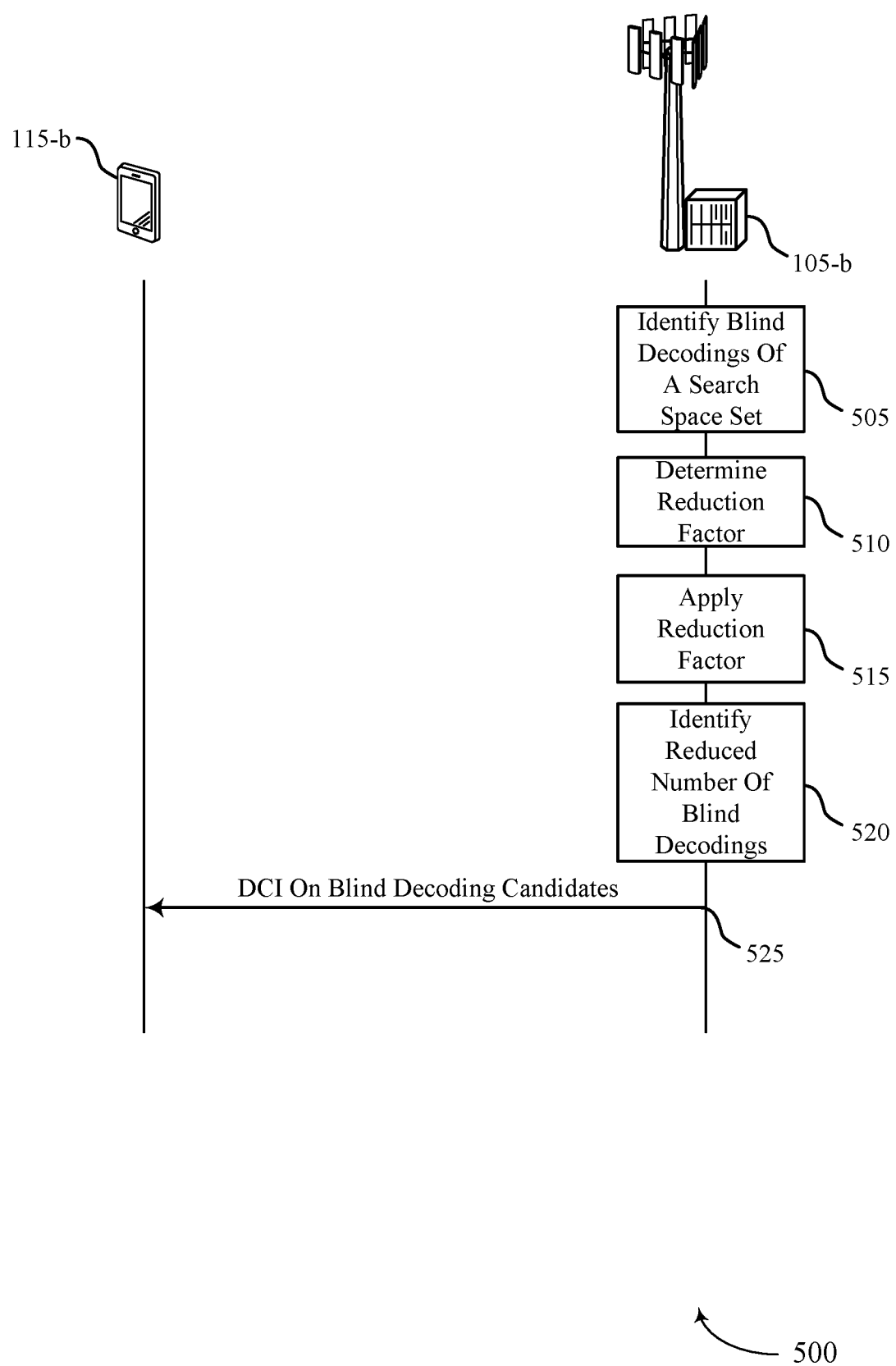
FIG. 5 illustrates an example of a process flow that supports search space set combining and dropping in accordance with aspects of the present disclosure.

FIG. 5 illustrates an example of a process flow 500 that supports search space set combining and dropping in accordance with various aspects of the present disclosure. In some examples, process flow 500 may implement aspects of wireless communications system 100. Process flow 500 may include UE 115-*b* and base station 105-*b*, which may be respective examples of a UE 115 and a base station 105 as described herein.

At 505, base station 105-*b* may identifying a number of blind decodings of a search space set, where a search space of the search space set includes a subset of blind decodings. In some cases, base station 105-*b* may identifying the number of blind decodings for each aggregation level of the search space set. In some cases, the search space may be associated with an aggregation level of the search space set.

At 510, base station 105-*b* may determine a reduction factor. In some cases, base station 105-*b* may identify a blind decoding limit for a slot and identify a number of blind decodings for each search space set in the slot. Base station 105-*b* may determine the reduction factor based on the blind decoding limit and the number of blind decodings for each search space set in the slot. In some examples, base station 105-*b* may determine a priority of the search space set, and the reduction factor may be determined based on the priority of the search space set. For example, the priority of the search space set may be associated with a type of information carried by DCI in the search space set.

At 515, base station 105-*b* may apply the reduction factor to the subset of blind decodings to obtain a reduced subset of blind decodings for the search space. For example, the reduction factor may be applied to the number of blind decodings in each aggregation level of the search space set to reduce the number of blind decodings in each aggregation level, thereby reducing the number of blind decodings in the search space set.

At 520, base station 105-*b* may identify a reduced number of blind decodings of the search space set based on the reduced subset of blind decodings. For example, due to the reduced number of blind decodings in each aggregation level of the search space set, the total number of blind decodings for the search space set may be reduced or pruned.

At 525, base station 105-*b* may hash the decoding candidates of the search space set and schedule DCI to transmit to UE 115-*b*. Base station 105-*b* may transmit the DCI in decoding candidates of search spaces belonging to the search space set.

Figure 6:
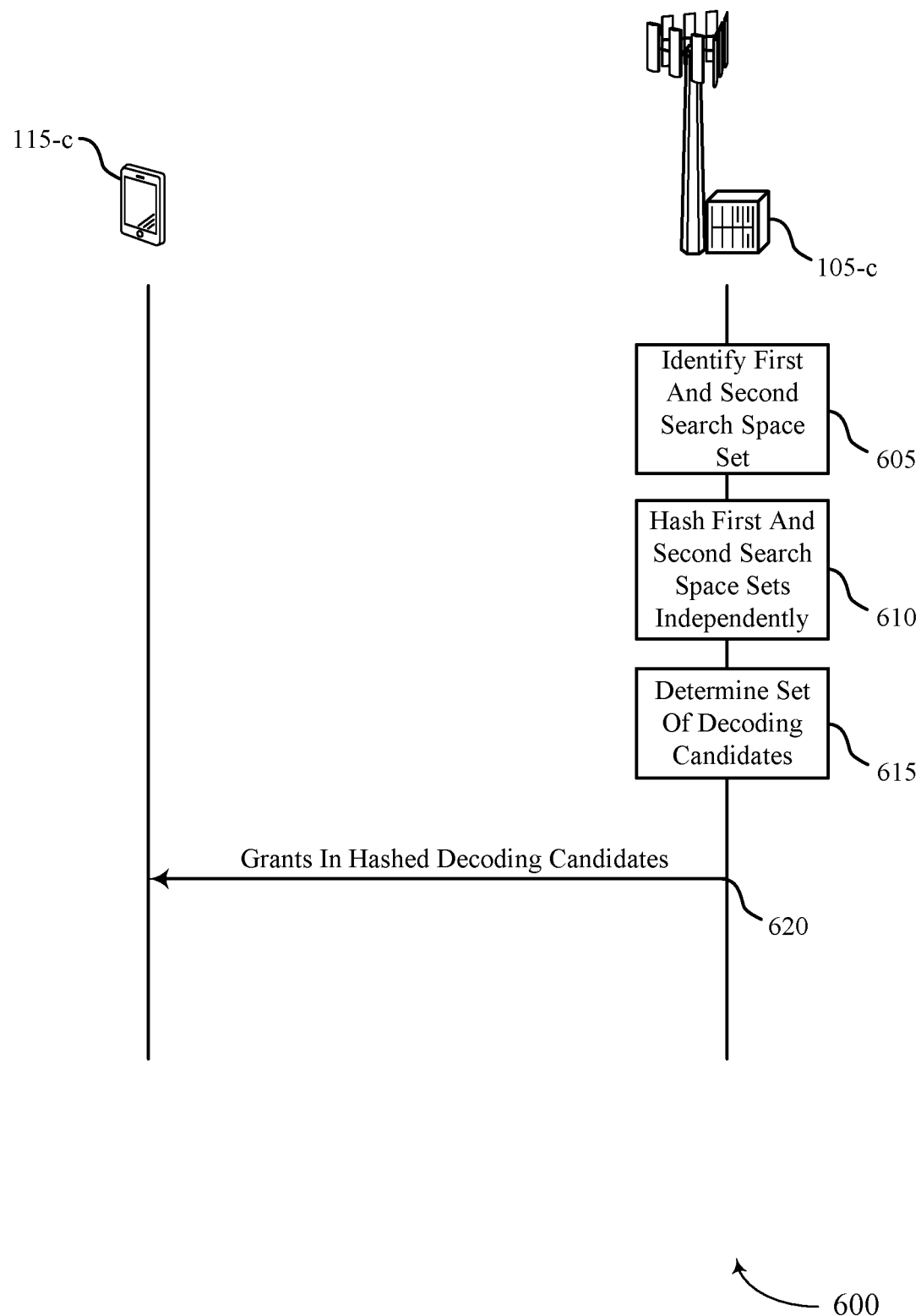
FIG. 6 illustrates an example of a process flow that supports search space set combining and dropping in accordance with aspects of the present disclosure.

FIG. 6 illustrates an example of a process flow 600 that supports search space set combining and dropping in accordance with various aspects of the present disclosure. In some examples, process flow 600 may implement aspects of wireless communications system 100. Process flow 600 may include UE 115-*c* and base station 105-*c*, which may be respective examples of a UE 115 and a base station 105 as described herein.

At 605, base station 105-*c* may identify a first search space set and a second search space set for a control resource set, where the first search space set includes a first set of decoding candidates and the second search space set includes a second set of decoding candidates. In some cases, the first search space set may be associated with a first control resource set monitoring occasion and the second search space set may be associated with a second control resource monitoring occasion.

At 610, base station 105-*c* may apply a first hash function to the first set of decoding candidates and apply a second hash function to the second set of decoding candidates. In some cases, the first set of decoding candidates and the second set of decoding candidates are individually applied to each aggregation level in the search space sets.

At 615, base station 105-*c* may determine a set of decoding candidates based on the first hash function and the second hash function. In some cases, a decoding candidate from the first hash function may overlap with a decoding candidate of the second hash function.

At 620, base station 105-*c* may transmit, to UE 115-*c*, a first grant carried by the first search space set in a hashed decoding candidate of the first search space set and transmit a second grant carried by the second search space set in a hashed decoding candidate of the second search space set.

Figure 7:
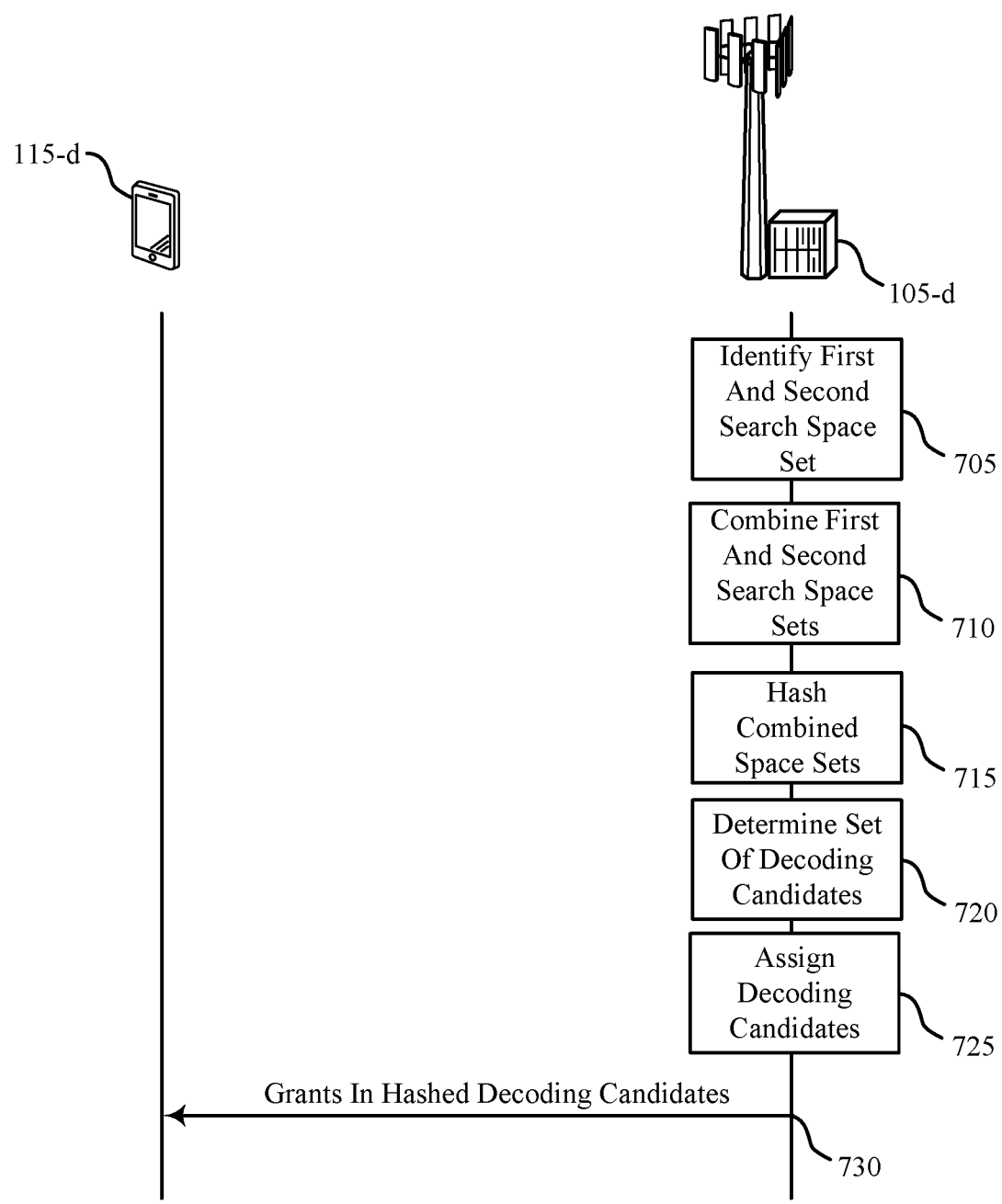
FIG. 7 illustrates an example of a process flow that supports search space set combining and dropping in accordance with aspects of the present disclosure.

FIG. 7 illustrates an example of a process flow 700 that supports search space set combining and dropping in accordance with various aspects of the present disclosure. In some examples, process flow 700 may implement aspects of wireless communications system 100. Process flow 700 may include UE 115-*d* and base station 105-*d*, which may be respective examples of a UE 115 and a base station 105 as described herein.

At 705, base station 105-*d* may identify a first search space set and a second search space set for a control resource set, where the first search space set includes a first set of decoding candidates and the second search space set includes a second set of decoding candidates. In some cases, the first set of decoding candidates and the second set of decoding candidates may be associated with a same aggregation level.

At 710, base station 105-*d* may identify a third set of decoding candidates based on the first set of decoding candidates and the second set of decoding candidates. In some cases, the third set of decoding candidates may be identified by combining the first set of decoding candidates and the second set of decoding candidates.

At 715, base station 105-*d* may apply a hash function to the third set of decoding candidates. At 720, base station 105-*d* may determine a set of decoding candidates for the control resource set based at least in part on the hash function.

At 725, base station **105-*d* may assign a portion of the set of decoding candidates for the control resource set to the first search space set and a remaining portion of the set of decoding candidates for the control resource set to the second search space set. At 730, base station 105-*d*** may transmit a first grant configured to be carried by the first search space set in one of the assigned decoding candidates of the first search space set and transmit a second grant configured to be carried by the second search space set in one of the assigned decoding candidates of the second search space set.

Figure 8:
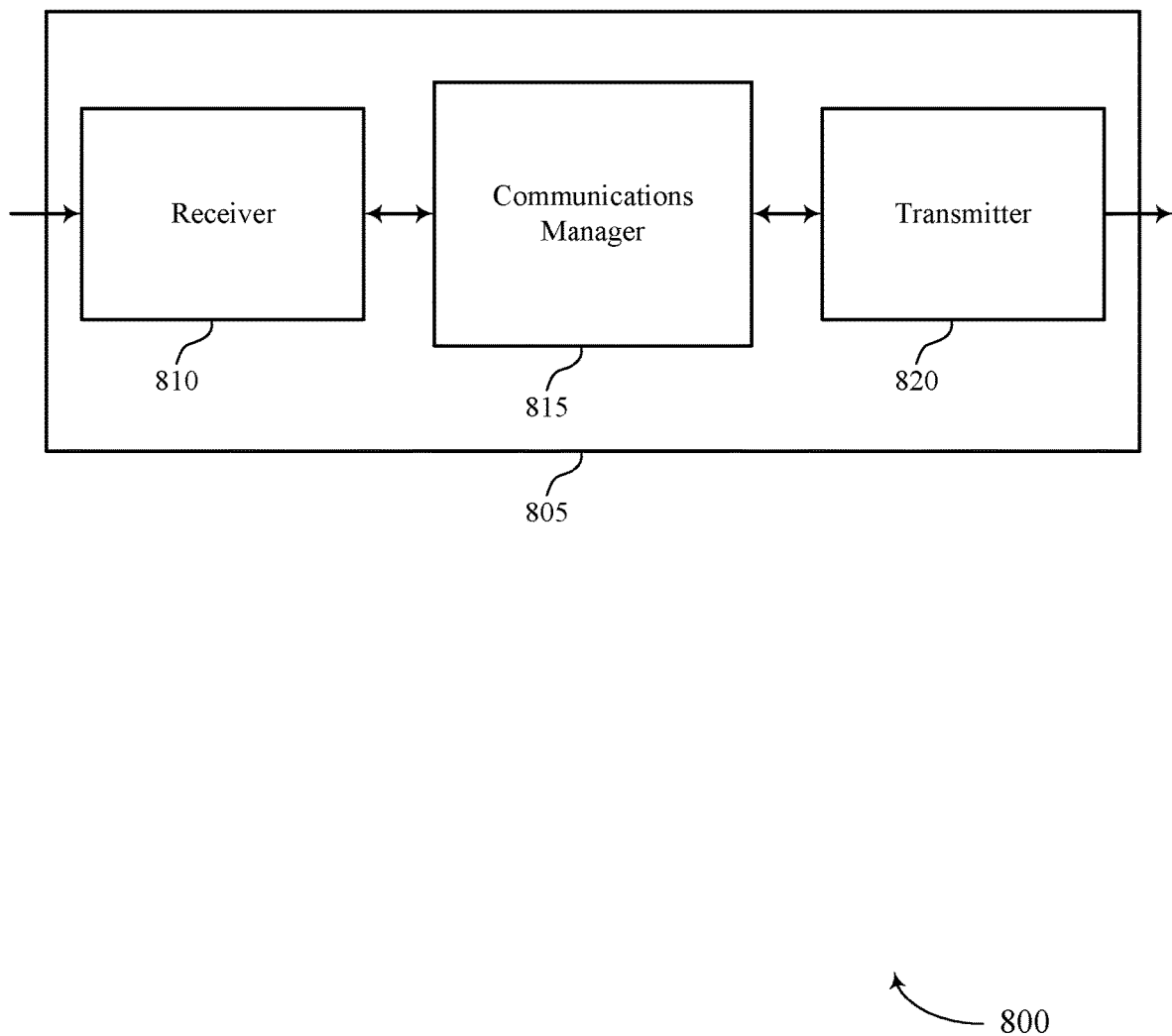
FIGS. 8 through 10 show block diagrams of a device that supports search space set combining and dropping in accordance with aspects of the present disclosure.

FIG. 8 shows a block diagram 800 of a wireless device 805 that supports search space set combining and dropping in accordance with aspects of the present disclosure. Wireless device 805 may be an example of aspects of a base station 105 as described herein. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to search space set combining and dropping, etc.). Information may be passed on to other components of the device. The receiver 810 may be an example of aspects of the transceiver 1135 described with reference to FIG. 11. The receiver 810 may utilize a single antenna or a set of antennas.

Communications manager 815 may be an example of aspects of the communications manager 1115 described with reference to FIG. 11.

Communications manager 815 and/or at least some of its various sub-components may be implemented in hardware, software executed by a processor, firmware, or any combination thereof. If implemented in software executed by a processor, the functions of the communications manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 815 and/or at least some of its various sub-components may be physically located at various positions, including being distributed such that portions of functions are implemented at different physical locations by one or more physical devices. In some examples, communications manager 815 and/or at least some of its various sub-components may be a separate and distinct component in accordance with various aspects of the present disclosure. In other examples, communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 815 may identify a number of blind decodings of a search space set, where a search space of the search space set includes a subset of blind decodings, determine a reduction factor, apply the reduction factor to the subset of blind decodings to obtain a reduced subset of blind decodings for the search space, and identify a reduced number of blind decodings of the search space set based on the reduced subset of blind decodings for the search space. The communications manager 815 may also identify a first search space set and a second search space set for a control resource set, where the first search space set includes a first set of decoding candidates and the second search space set includes a second set of decoding candidates, apply a first hash function to the first set of decoding candidates and applying a second hash function to the second set of decoding candidates, and determine a set of decoding candidates for the control resource set based on the first hash function and the second hash function. In some cases, the communications manager 815 may identify a first search space set and a second search space set for a control resource set, where the first search space set includes a first set of decoding candidates and the second search space set includes a second set of decoding candidates, identify a third set of decoding candidates based on the first set of decoding candidates and the second set of decoding candidates, apply a hash function to the third set of decoding candidates, determine a set of decoding candidates for the control resource set based on the hash function, and assign a portion of the set of decoding candidates for the control resource set to the first search space set and a remaining portion of the set of decoding candidates for the control resource set to the second search space set.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
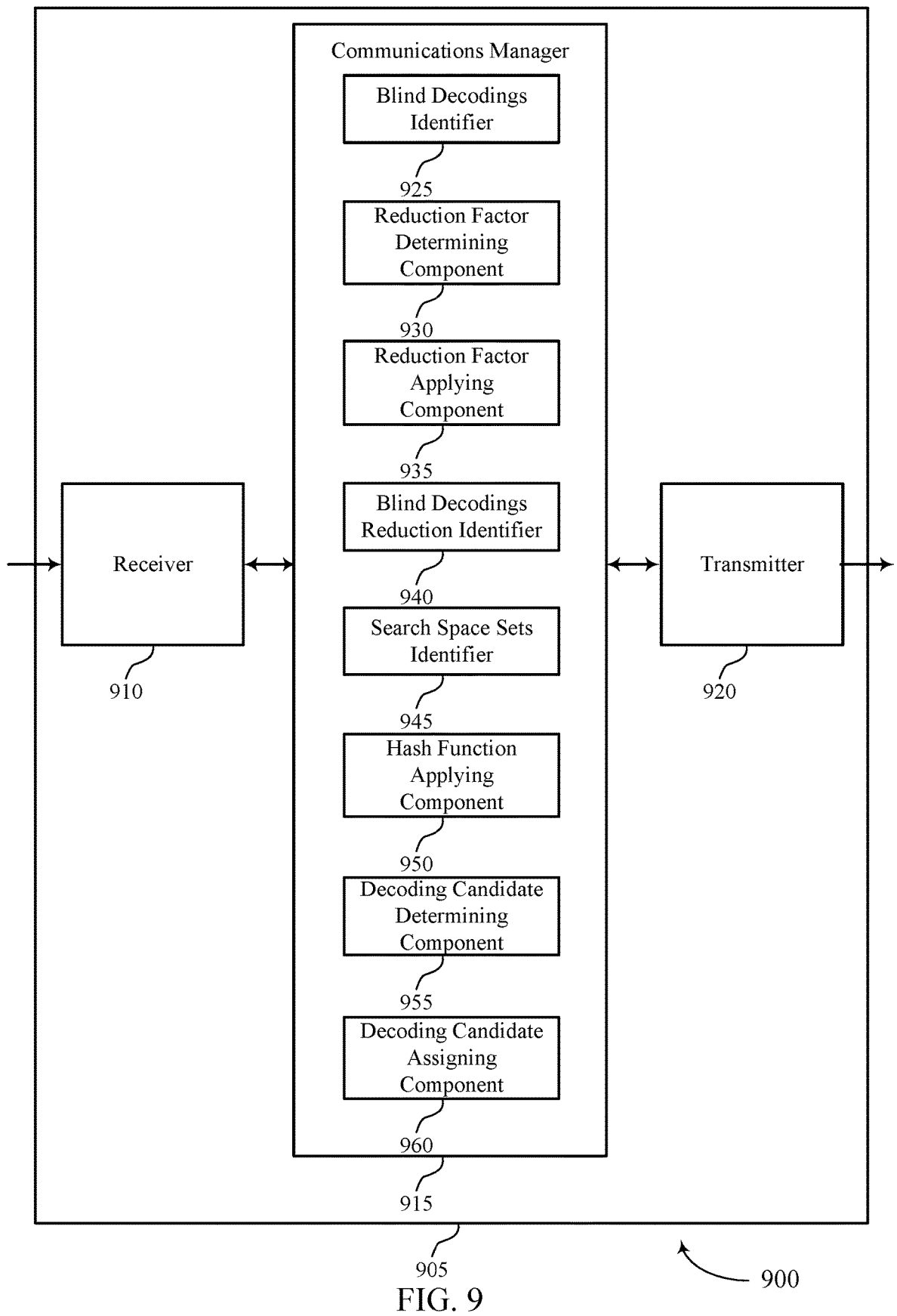

FIG. 9 shows a block diagram 900 of a wireless device 905 that supports search space set combining and dropping in accordance with aspects of the present disclosure. Wireless device 905 may be an example of aspects of a wireless device 805 or a base station 105 as described with reference to FIG. 8. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to search space set combining and dropping, etc.). Information may be passed on to other components of the device. The receiver 910 may be an example of aspects of the transceiver 1135 described with reference to FIG. 11. The receiver 910 may utilize a single antenna or a set of antennas.

Communications manager 915 may be an example of aspects of the communications manager 1115 described with reference to FIG. 11.

Communications manager 915 may also include blind decodings identifier 925, reduction factor determining component 930, reduction factor applying component 935, blind decodings reduction identifier 940, search space sets identifier 945, hash function applying component 950, decoding candidate determining component 955, and decoding candidate assigning component 960.

Blind decodings identifier 925 may identify a number of blind decodings of a search space set, where a search space of the search space set includes a subset of blind decodings.

In some cases, the search space set is a UE-specific search space set carrying DCI for a single UE.

Reduction factor determining component 930 may determine a reduction factor, identify a number of blind decodings for each search space set in the slot, and determine the reduction factor based on the blind decoding limit and the number of blind decodings for each search space set in the slot. In some cases, determining the reduction factor further includes identifying a blind decoding limit for a slot. In some cases, the blind decoding limit is based on a UE capability.

Reduction factor applying component 935 may apply the reduction factor to the subset of blind decodings to obtain a reduced subset of blind decodings for the search space.

Blind decodings reduction identifier 940 may identify a reduced number of blind decodings of the search space set based on the reduced subset of blind decodings for the search space. In some cases, the reduced subset of blind decodings for the search space includes at least one blind decoding.

Search space sets identifier 945 may identify a first search space set and a second search space set for a control resource set, where the first search space set includes a first set of decoding candidates and the second search space set includes a second set of decoding candidates and identify a third set of decoding candidates based on the first set of decoding candidates and the second set of decoding candidates. In some cases, the first search space set is a first UE-specific search space set and the second search space set is a second UE-specific search space set. In some cases, the first search space set is associated with a first control resource set monitoring occasion and the second search space set is associated with a second control resource monitoring occasion. In some cases, identifying the third set of decoding candidates further includes combining the first set of decoding candidates and the second set of decoding candidates. In some cases, the first search space set is a first UE-specific search space set and the second search space set is a second UE-specific search space set. In some cases, the first search space set is associated with a first control resource set monitoring occasion and the second search space set is associated with a second control resource monitoring occasion.

Hash function applying component 950 may apply a first hash function to the first set of decoding candidates and applying a second hash function to the second set of decoding candidates and apply a hash function to the third set of decoding candidates. In some cases, the first set of decoding candidates and the second set of decoding candidates are individually applied to each aggregation level in the search space sets.

Decoding candidate determining component 955 may determine a set of decoding candidates for the control resource set based on the first hash function and the second hash function and determine a set of decoding candidates for the control resource set based on the hash function. In some cases, an initial positioning of the first set of decoding candidates is independent from the initial positioning of the second set of decoding candidates. In some cases, the initial positioning of the first set of decoding candidates or the second set of decoding candidates is based on a random number or an index of a UE associated with the first search space set or the second search space set. In some cases, the first set of decoding candidates and the second set of decoding candidates are associated with a same aggregation level.

Decoding candidate assigning component 960 may assign a portion of the set of decoding candidates for the control resource set to the first search space set and a remaining portion of the set of decoding candidates for the control resource set to the second search space set.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
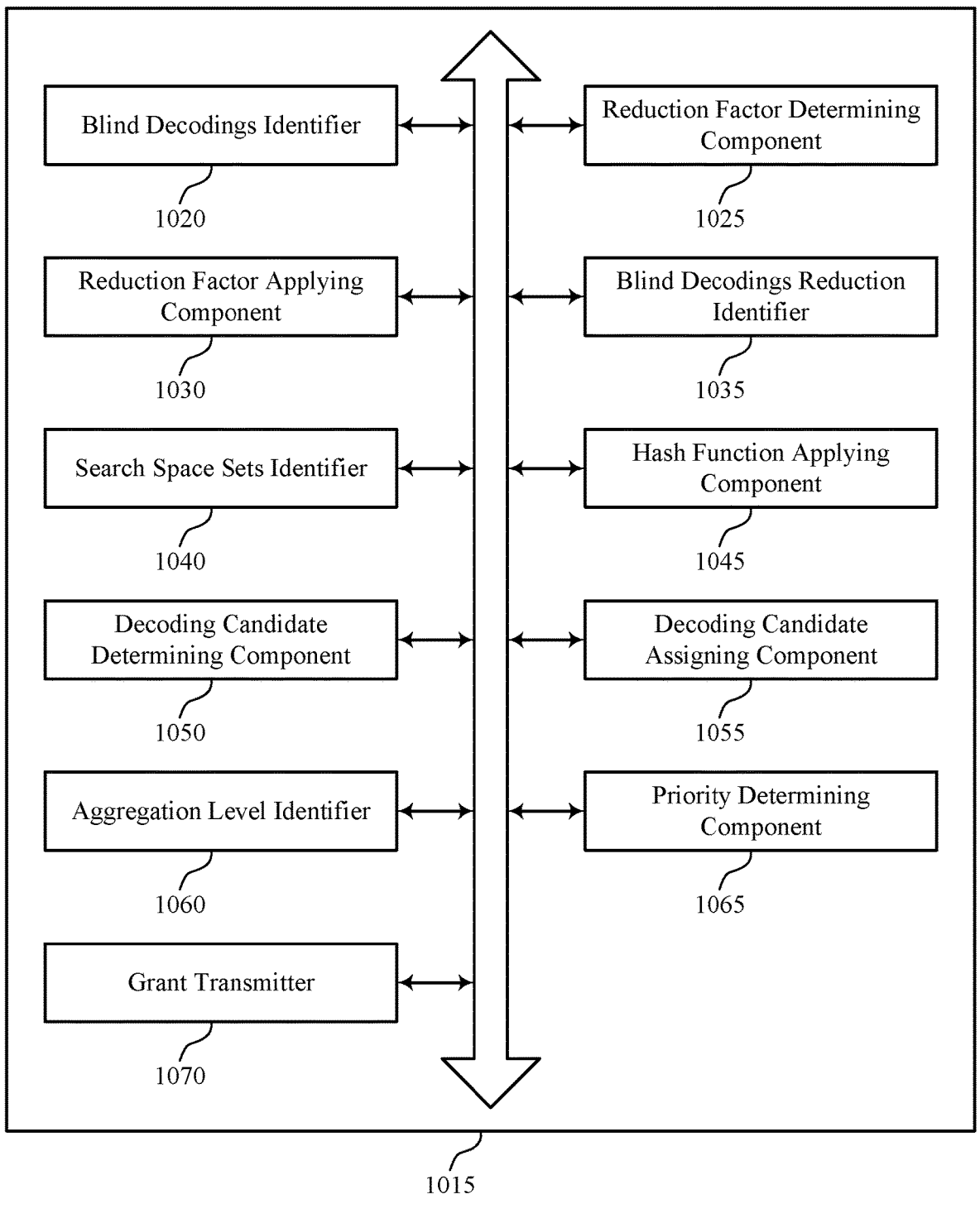

FIG. 10 shows a block diagram 1000 of a communications manager 1015 that supports search space set combining and dropping in accordance with aspects of the present disclosure. The communications manager 1015 may be an example of aspects of a communications manager 815, a communications manager 915, or a communications manager 1115 described with reference to FIGS. 8, 9, and 11. The communications manager 1015 may include blind decodings identifier 1020, reduction factor determining component 1025, reduction factor applying component 1030, blind decodings reduction identifier 1035, search space sets identifier 1040, hash function applying component 1045, decoding candidate determining component 1050, decoding candidate assigning component 1055, aggregation level identifier 1060, priority determining component 1065, and grant transmitter 1070. Each of these modules may communicate, directly or indirectly, with one another (e.g., via one or more buses).

Blind decodings identifier 1020 may identify a number of blind decodings of a search space set, where a search space of the search space set includes a subset of blind decodings. In some cases, the search space set is a UE-specific search space set carrying DCI for a single UE.

Reduction factor determining component 1025 may determine a reduction factor, identify a number of blind decodings for each search space set in the slot, and determine the reduction factor based on the blind decoding limit and the number of blind decodings for each search space set in the slot. In some cases, determining the reduction factor further includes: identifying a blind decoding limit for a slot. In some cases, the blind decoding limit is based on a UE capability.

Reduction factor applying component 1030 may apply the reduction factor to the subset of blind decodings to obtain a reduced subset of blind decodings for the search space.

Blind decodings reduction identifier 1035 may identify a reduced number of blind decodings of the search space set based on the reduced subset of blind decodings for the search space. In some cases, the reduced subset of blind decodings for the search space includes at least one blind decoding.

Search space sets identifier 1040 may identify a first search space set and a second search space set for a control resource set, where the first search space set includes a first set of decoding candidates and the second search space set includes a second set of decoding candidates and identify a third set of decoding candidates based on the first set of decoding candidates and the second set of decoding candidates. In some cases, identifying the third set of decoding candidates further includes: combining the first set of decoding candidates and the second set of decoding candidates. In some examples, the first search space set is a first UE-specific search space set and the second search space set is a second UE-specific search space set. The first search space set may be associated with a first control resource set monitoring occasion and the second search space set may be associated with a second control resource monitoring occasion. In some cases, the first search space set is a first UE-specific search space set and the second search space set is a second UE-specific search space set. In some cases, the first search space set is associated with a first control resource set monitoring occasion and the second search space set is associated with a second control resource monitoring occasion.

Hash function applying component 1045 may apply a first hash function to the first set of decoding candidates and applying a second hash function to the second set of decoding candidates and apply a hash function to the third set of decoding candidates. In some cases, the first set of decoding candidates and the second set of decoding candidates are individually applied to each aggregation level in the search space sets.

Decoding candidate determining component 1050 may determine a set of decoding candidates for the control resource set based on the first hash function and the second hash function and determine a set of decoding candidates for the control resource set based on the hash function. In some cases, an initial positioning of the first set of decoding candidates is independent from the initial positioning of the second set of decoding candidates. In some cases, the initial positioning of the first set of decoding candidates or the second set of decoding candidates is based on a random number or an index of a UE associated with the first search space set or the second search space set. In some cases, the first set of decoding candidates and the second set of decoding candidates are associated with a same aggregation level.

Decoding candidate assigning component 1055 may assign a portion of the set of decoding candidates for the control resource set to the first search space set and a remaining portion of the set of decoding candidates for the control resource set to the second search space set.

Aggregation level identifier 1060 may identify the aggregation levels of the search space set. In some cases, identifying the number of blind decodings of the search space set further includes: identifying the number of blind decodings for each aggregation level of the search space set. In some cases, the search space is associated with an aggregation level of the search space set.

Priority determining component 1065 may determine a priority of the search space set, where the reduction factor is determined based on the priority of the search space set and determine a priority of the search space based on an aggregation level of the search space, where the reduction factor is determined based on the priority of the priority of the search space. In some cases, the priority of the search space is configured by radio resource control (RRC) signaling. In some cases, the priority of the search space set is associated with a type of information carried by DCI in the search space set.

Grant transmitter 1070 may transmit a first grant carried by the first search space set in a hashed decoding candidate of the first search space set, and transmitting a second grant carried by the second search space set in a hashed decoding candidate of the second search space set and transmit a first grant configured to be carried by the first search space set in one of the assigned decoding candidates of the first search space set, and transmitting a second grant configured to be carried by the second search space set in one of the assigned decoding candidates of the second search space set.

Figure 11:
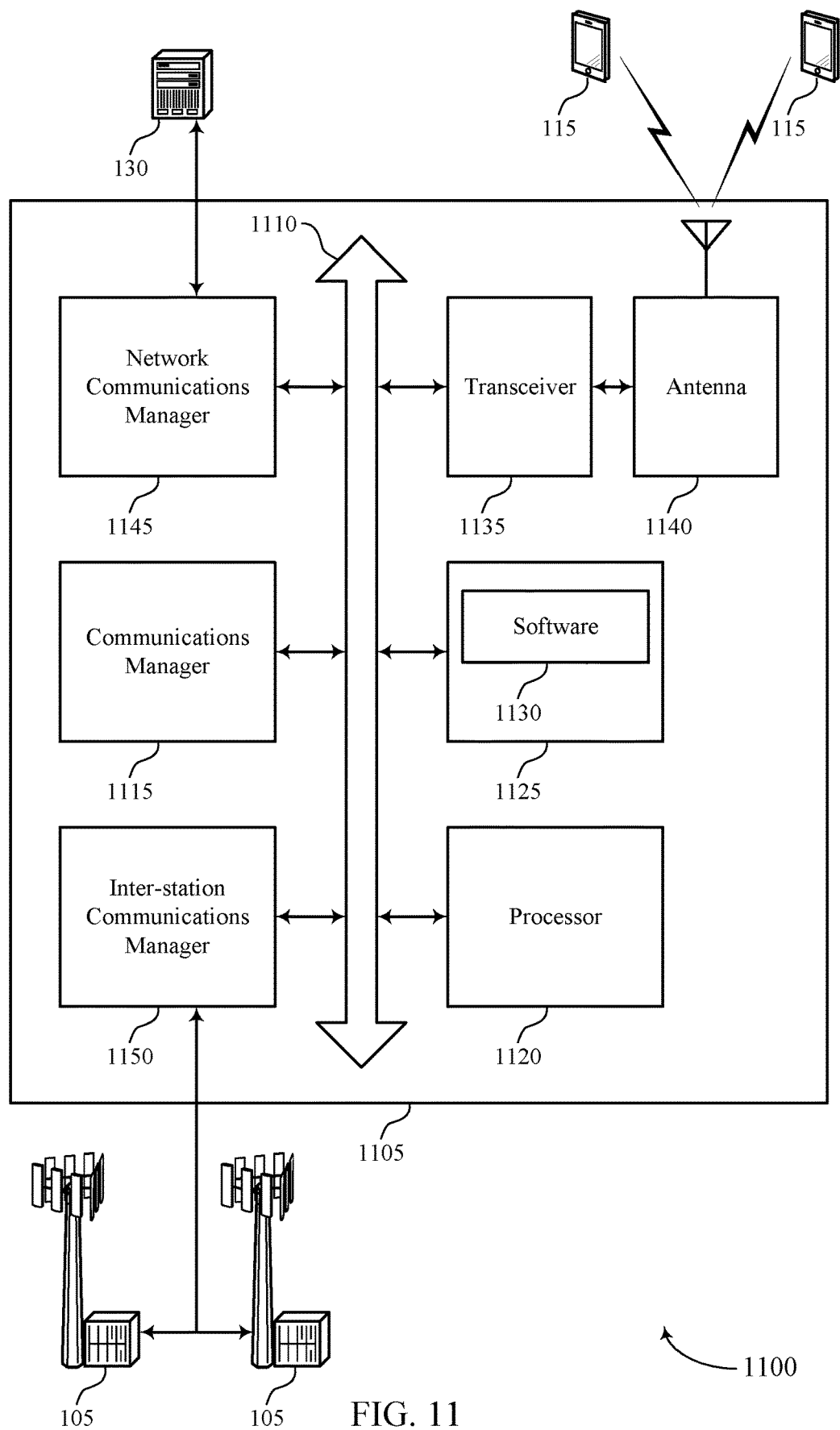
FIG. 11 illustrates a block diagram of a system including a base station that supports search space set combining and dropping in accordance with aspects of the present disclosure.

FIG. 11 shows a diagram of a system 1100 including a device 1105 that supports search space set combining and dropping in accordance with aspects of the present disclosure. Device 1105 may be an example of or include the components of wireless device 805, wireless device 905, or a base station 105 as described herein, e.g., with reference to FIGS. 8 and 9. Device 1105 may include components for bi-directional voice and data communications including components for transmitting and receiving communications, including communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting search space set combining and dropping).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support search space set combining and dropping. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a Long Term Evolution (LTE)/LTE-A wireless communication network technology to provide communication between base stations 105.

Figure 12:
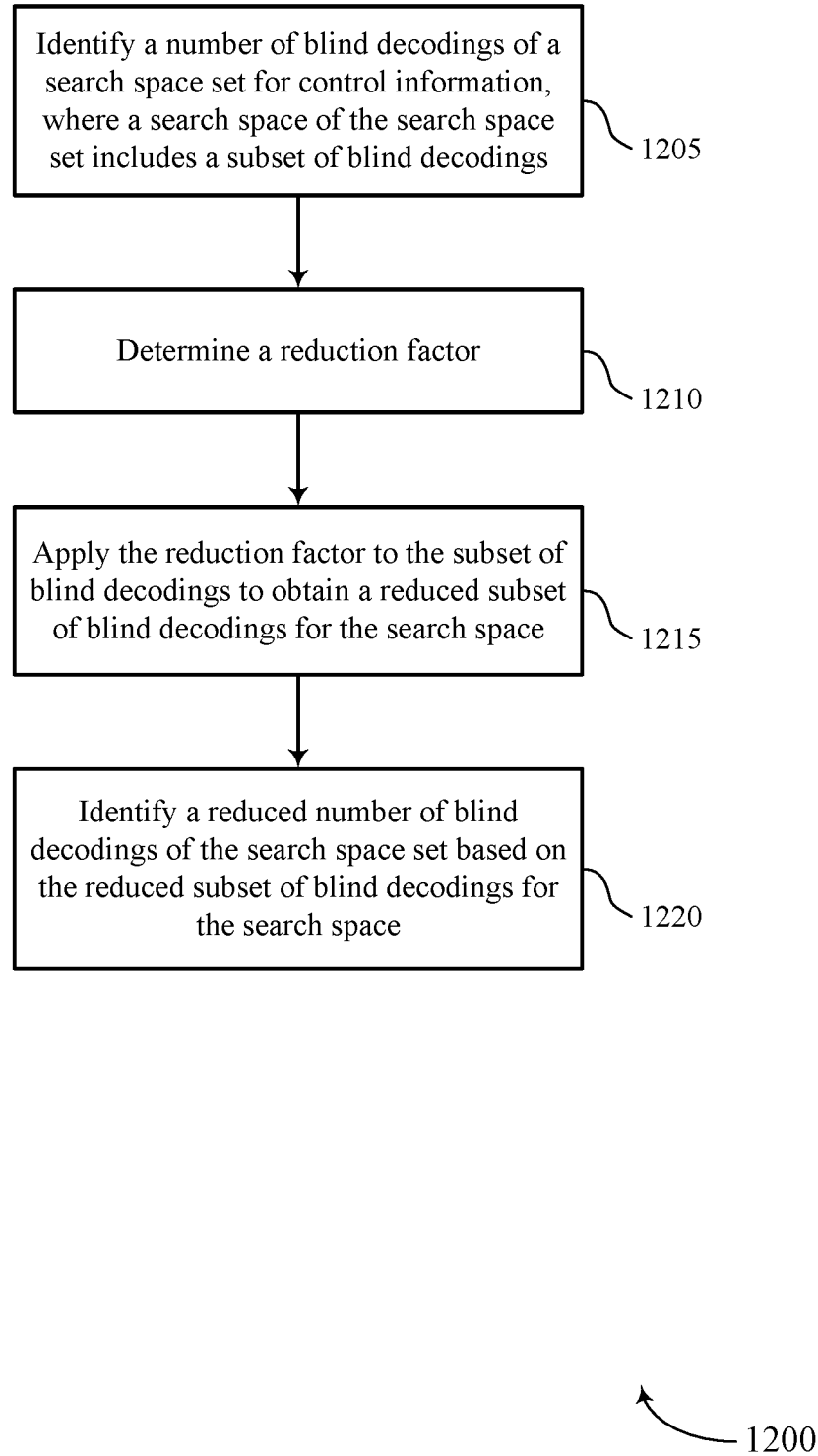
FIGS. 12 through 15 illustrate methods for search space set combining and dropping in accordance with aspects of the present disclosure.

FIG. 12 shows a flowchart illustrating a method 1200 for search space set combining and dropping in accordance with aspects of the present disclosure. The operations of method 1200 may be implemented by a base station 105 or its components as described herein. For example, the operations of method 1200 may be performed by a communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At 1205 the base station 105 may identify a number of blind decodings of a search space set, wherein a search space of the search space set comprises a subset of blind decodings. The operations of 1205 may be performed according to the methods described herein. In certain examples, aspects of the operations of 1205 may be performed by a blind decodings identifier as described with reference to FIGS. 8 through 11.

At 1210 the base station 105 may determine a reduction factor. The operations of 1210 may be performed according to the methods described herein. In certain examples, aspects of the operations of 1210 may be performed by a reduction factor determining component as described with reference to FIGS. 8 through 11.

At 1215 the base station 105 may apply the reduction factor to the subset of blind decodings to obtain a reduced subset of blind decodings for the search space. The operations of 1215 may be performed according to the methods described herein. In certain examples, aspects of the operations of 1215 may be performed by a reduction factor applying component as described with reference to FIGS. 8 through 11.

At 1220 the base station 105 may identify a reduced number of blind decodings of the search space set based at least in part on the reduced subset of blind decodings for the search space. The operations of 1220 may be performed according to the methods described herein. In certain examples, aspects of the operations of 1220 may be performed by a blind decodings reduction identifier as described with reference to FIGS. 8 through 11.

Figure 13:
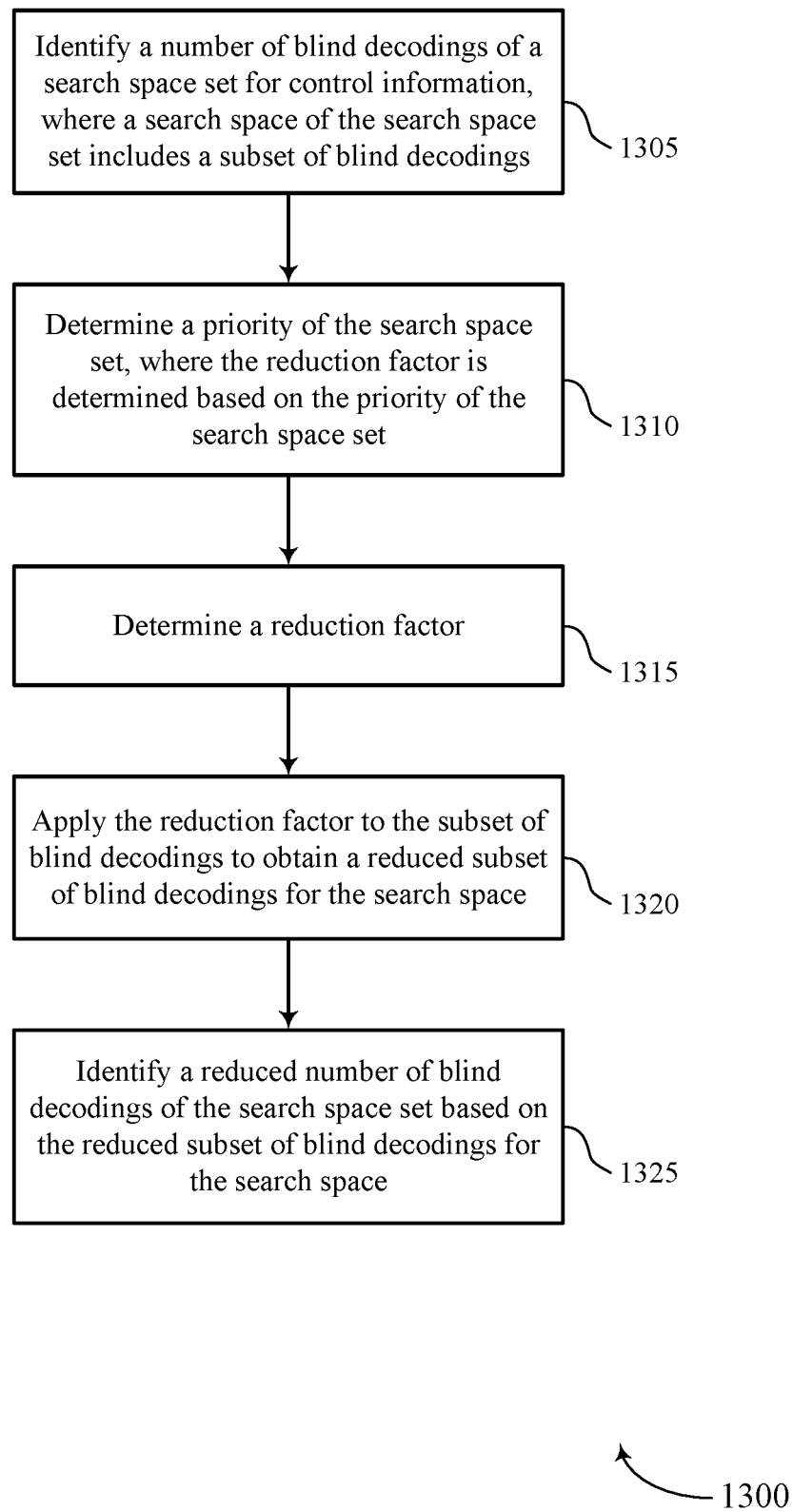

FIG. 13 shows a flowchart illustrating a method 1300 for search space set combining and dropping in accordance with aspects of the present disclosure. The operations of method 1300 may be implemented by a base station 105 or its components as described herein. For example, the operations of method 1300 may be performed by a communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At 1305 the base station 105 may identify a number of blind decodings of a search space set, wherein a search space of the search space set comprises a subset of blind decodings. The operations of 1305 may be performed according to the methods described herein. In certain examples, aspects of the operations of 1305 may be performed by a blind decodings identifier as described with reference to FIGS. 8 through 11.

At 1310 the base station 105 may determine a priority of the search space set, wherein the reduction factor is determined based at least in part on the priority of the search space set. The operations of 1310 may be performed according to the methods described herein. In certain examples, aspects of the operations of 1310 may be performed by a priority determining component as described with reference to FIGS. 8 through 11.

At 1315 the base station 105 may determine a reduction factor. The operations of 1315 may be performed according to the methods described herein. In certain examples, aspects of the operations of 1315 may be performed by a reduction factor determining component as described with reference to FIGS. 8 through 11.

At 1320 the base station 105 may apply the reduction factor to the subset of blind decodings to obtain a reduced subset of blind decodings for the search space. The operations of 1320 may be performed according to the methods described herein. In certain examples, aspects of the operations of 1320 may be performed by a reduction factor applying component as described with reference to FIGS. 8 through 11.

At 1325 the base station 105 may identify a reduced number of blind decodings of the search space set based at least in part on the reduced subset of blind decodings for the search space. The operations of 1325 may be performed according to the methods described herein. In certain examples, aspects of the operations of 1325 may be performed by a blind decodings reduction identifier as described with reference to FIGS. 8 through 11.

Figure 14:
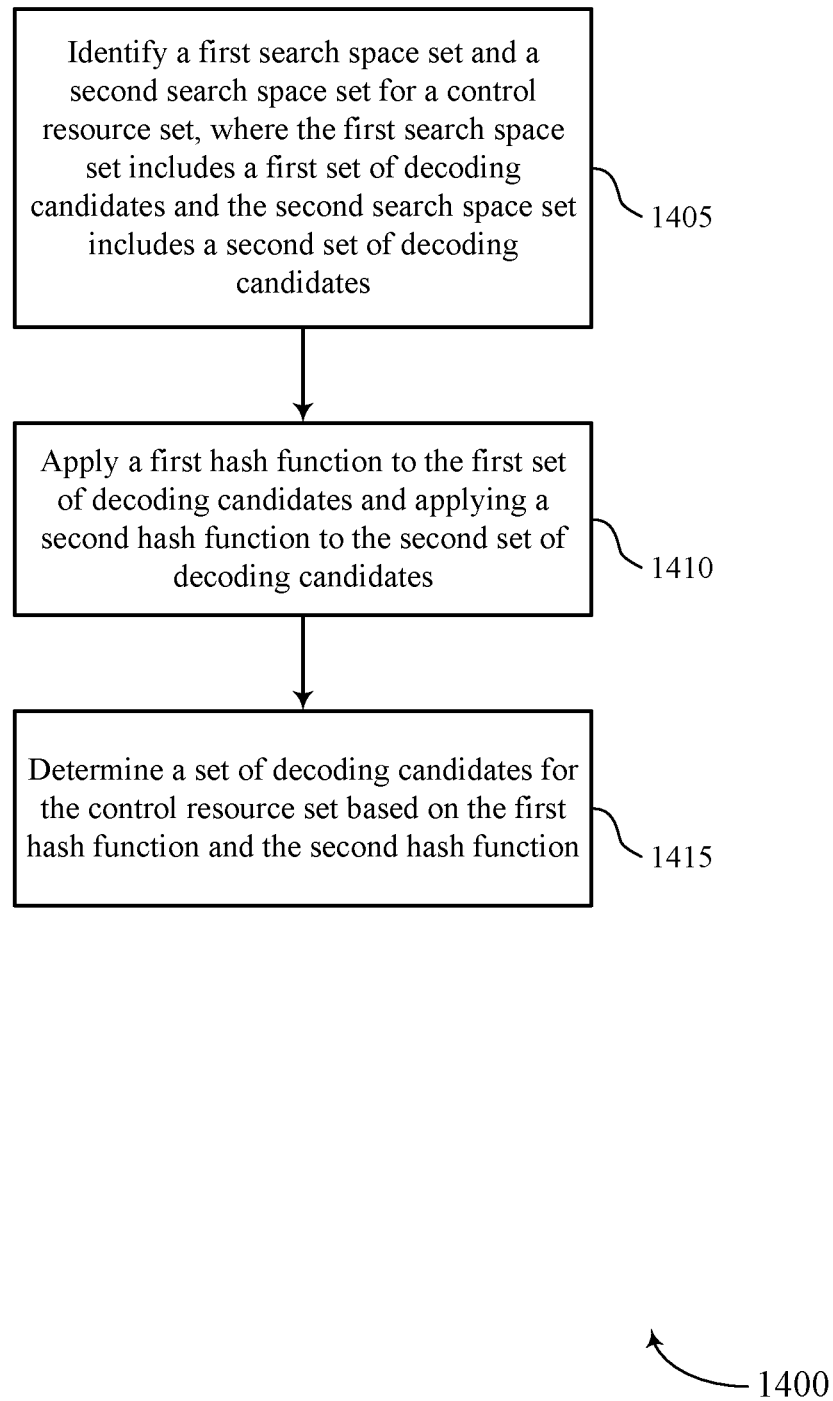

FIG. 14 shows a flowchart illustrating a method 1400 for search space set combining and dropping in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At 1405 the base station 105 may identify a first search space set and a second search space set for a control resource set, wherein the first search space set comprises a first set of decoding candidates and the second search space set comprises a second set of decoding candidates. The operations of 1405 may be performed according to the methods described herein. In certain examples, aspects of the operations of 1405 may be performed by a search space sets identifier as described with reference to FIGS. 8 through 11.

At 1410 the base station 105 may apply a first hash function to the first set of decoding candidates and applying a second hash function to the second set of decoding candidates. The operations of 1410 may be performed according to the methods described herein. In certain examples, aspects of the operations of 1410 may be performed by a hash function applying component as described with reference to FIGS. 8 through 11.

At 1415 the base station 105 may determine a set of decoding candidates for the control resource set based at least in part on the first hash function and the second hash function. The operations of 1415 may be performed according to the methods described herein. In certain examples, aspects of the operations of 1415 may be performed by a decoding candidate determining component as described with reference to FIGS. 8 through 11.

Figure 15:
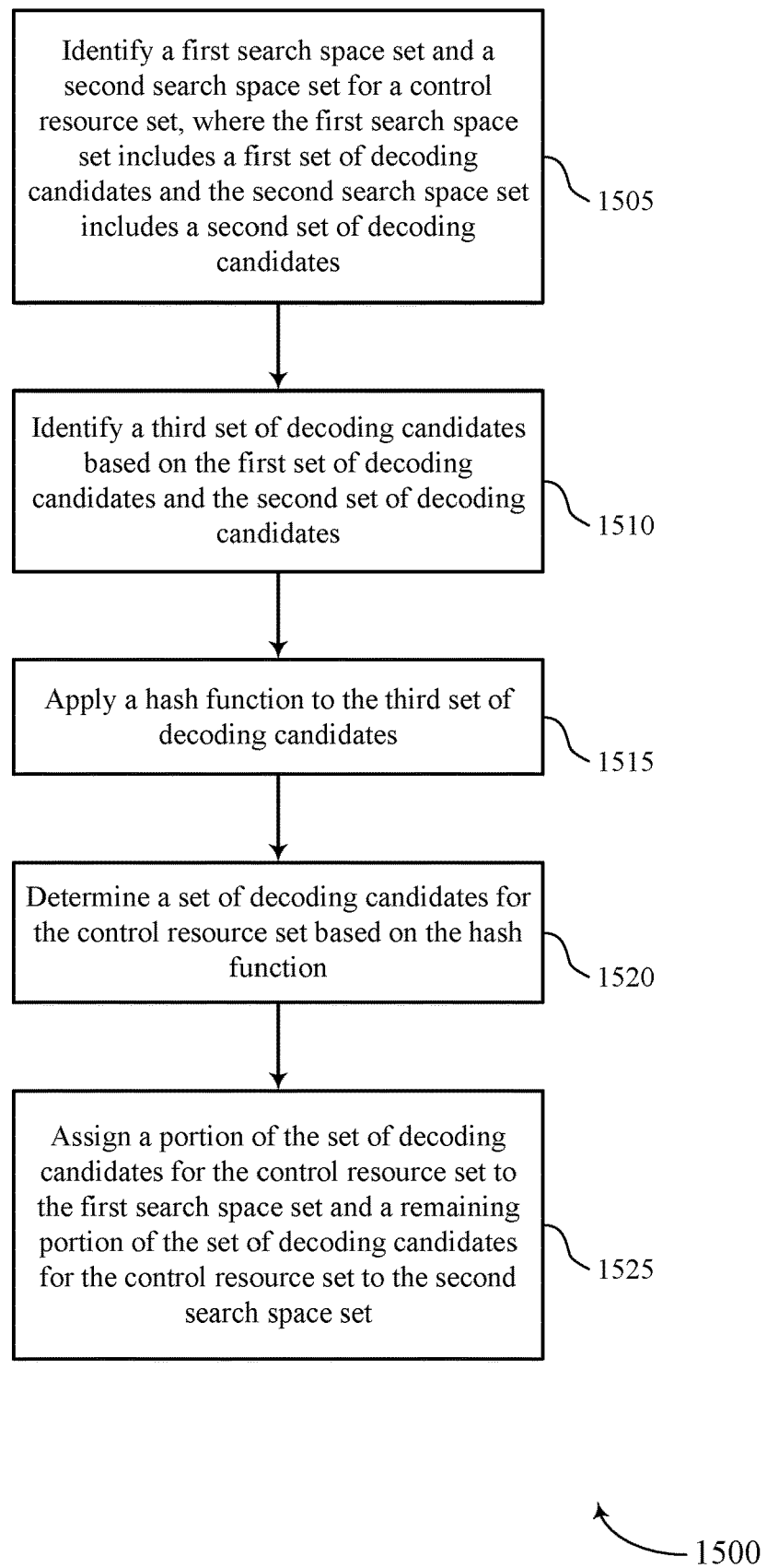

FIG. 15 shows a flowchart illustrating a method 1500 for search space set combining and dropping in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station 105 may execute a set of codes to control the functional elements of the device to perform the functions described herein. Additionally or alternatively, the base station 105 may perform aspects of the functions described herein using special-purpose hardware.

At 1505 the base station 105 may identify a first search space set and a second search space set for a control resource set, wherein the first search space set comprises a first set of decoding candidates and the second search space set comprises a second set of decoding candidates. The operations of 1505 may be performed according to the methods described herein. In certain examples, aspects of the operations of 1505 may be performed by a search space sets identifier as described with reference to FIGS. 8 through 11.

At 1510 the base station 105 may identify a third set of decoding candidates based at least in part on the first set of decoding candidates and the second set of decoding candidates. The operations of 1510 may be performed according to the methods described herein. In certain examples, aspects of the operations of 1510 may be performed by a search space sets identifier as described with reference to FIGS. 8 through 11.

At 1515 the base station 105 may apply a hash function to the third set of decoding candidates. The operations of 1515 may be performed according to the methods described herein. In certain examples, aspects of the operations of 1515 may be performed by a hash function applying component as described with reference to FIGS. 8 through 11.

At 1520 the base station 105 may determine a set of decoding candidates for the control resource set based at least in part on the hash function. The operations of 1520 may be performed according to the methods described herein. In certain examples, aspects of the operations of 1520 may be performed by a decoding candidate determining component as described with reference to FIGS. 8 through 11.

At 1525 the base station 105 may assign a portion of the set of decoding candidates for the control resource set to the first search space set and a remaining portion of the set of decoding candidates for the control resource set to the second search space set. The operations of 1525 may be performed according to the methods described herein. In certain examples, aspects of the operations of 1525 may be performed by a decoding candidate assigning component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a number of blind decodings of a search space set for control information, wherein a search space of the search space set comprises a subset of blind decodings;
    determining a priority of the search space set;
    determining a reduction factor based at least in part on the priority of the search space set;
    applying the reduction factor to the subset of blind decodings to obtain a reduced subset of blind decodings for the search space;
    identifying a reduced number of blind decodings of the search space set based at least in part on the reduced subset of blind decodings for the search space; and
    transmitting the control information in a decoding candidate of the reduced number of blind decodings of the search space.

2. The method of claim 1, wherein the reduction factor is 0 when the subset of blind decodings is equal to the reduced subset of blind decodings for the search space, or the reduction factor is 1 when the reduced subset of blind decodings for the search space is completely reduced.

3. The method of claim 1, wherein determining the reduction factor further comprises:

identifying the blind decoding limit for a slot;
identifying a number of blind decodings for each search space set in the slot; and
determining the reduction factor based at least in part on the blind decoding limit and the number of blind decodings for each search space set in the slot.

4. The method of claim 3, wherein the blind decoding limit is based at least in part on a user equipment (UE) capability.

5. The method of claim 1, wherein identifying the number of blind decodings of the search space set further comprises:
identifying the number of blind decodings for each aggregation level of the search space set.

6. The method of claim 1, wherein the search space is associated with an aggregation level of the search space set.

7. The method of claim 1, wherein the reduced subset of blind decodings for the search space comprises at least one blind decoding.

8. The method of claim 1, wherein the priority of a common search space is higher than the priority of a UE-specific search space.

9. The method of claim 8, wherein the reduction factor of the common search space is 0.

10. The method of claim 1, wherein the priority of the search space is configured by radio resource control (RRC) signaling.

11. The method of claim 1, wherein the priority of the search space set is associated with a type of information carried by downlink control information (DCI) in the search space set.

12. The method of claim 1, further comprising:
determining a priority of the search space based at least in part on an aggregation level of the search space, wherein the reduction factor is determined based at least in part on the priority of the priority of the search space.

13. The method of claim 1, wherein the search space set is a user equipment (UE)-specific search space set carrying downlink control information (DCI) for a single UE.

14. An apparatus for wireless communication, comprising:
means for identifying a number of blind decodings of a search space set for control information, wherein a search space of the search space set comprises a subset of blind decodings;
means for determining a priority of the search space set;
means for determining a reduction factor based at least in part on the priority of the search space set;
means for applying the reduction factor to the subset of blind decodings to obtain a reduced subset of blind decodings for the search space;
means for identifying a reduced number of blind decodings of the search space set based at least in part on the reduced subset of blind decodings for the search space; and
means for transmitting the control information in a decoding candidate of the reduced number of blind decodings of the search space.

15. An apparatus for wireless communication, comprising:
a processor;
memory coupled with the processor; and
instructions stored in the memory and executable by the processor to cause the apparatus to:
identify a number of blind decodings of a search space set for control information, wherein a search space of the search space set comprises a subset of blind decodings;
determine a priority of the search space set;
determine a reduction factor based at least in part on the priority of the search space set;
apply the reduction factor to the subset of blind decodings to obtain a reduced subset of blind decodings for the search space;
identify a reduced number of blind decodings of the search space set based at least in part on the reduced subset of blind decodings for the search space; and
transmit the control information in a decoding candidate of the reduced number of blind decodings of the search space.

16. The apparatus of claim 15, wherein the reduction factor is 0 when the subset of blind decodings is equal to the reduced subset of blind decodings for the search space, or the reduction factor is 1 when the reduced subset of blind decodings for the search space is completely reduced.

17. The apparatus of claim 15, wherein the instructions to determine the reduction factor further are executable by the processor to cause the apparatus to:
identify the blind decoding limit for a slot;
identify a number of blind decodings for each search space set in the slot; and
determine the reduction factor based at least in part on the blind decoding limit and the number of blind decodings for each search space set in the slot.

18. The apparatus of claim 17, wherein the blind decoding limit is based at least in part on a user equipment (UE) capability.

19. The apparatus of claim 15, wherein the instructions to identify the number of blind decodings of the search space set further are executable by the processor to cause the apparatus to:
identify the number of blind decodings for each aggregation level of the search space set.

20. The apparatus of claim 15, wherein the search space is associated with an aggregation level of the search space set.

21. The apparatus of claim 15, wherein the reduced subset of blind decodings for the search space comprises at least one blind decoding.

22. The apparatus of claim 15, wherein the priority of a common search space is higher than the priority of a UE-specific search space.

23. The apparatus of claim 22, wherein the reduction factor of the common search space is 0.

24. The apparatus of claim 15, wherein the priority of the search space is configured by radio resource control (RRC) signaling.

25. The apparatus of claim 15, wherein the priority of the search space set is associated with a type of information carried by downlink control information (DCI) in the search space set.

26. The apparatus of claim 15, wherein the instructions are further executable by the processor to cause the apparatus to:
determine a priority of the search space based at least in part on an aggregation level of the search space, wherein the reduction factor is determined based at least in part on the priority of the priority of the search space.

27. The apparatus of claim 15, wherein the search space set is a user equipment (UE)-specific search space set carrying downlink control information (DCI) for a single UE.

28. A non-transitory computer-readable medium storing code for wireless communication, the code comprising instructions executable by a processor to:
- identify a number of blind decodings of a search space set for control information, wherein a search space of the search space set comprises a subset of blind decodings;
- determine a priority of the search space set;
- determine a reduction factor based at least in part on the priority of the search space set;
- apply the reduction factor to the subset of blind decodings to obtain a reduced subset of blind decodings for the search space;
- identify a reduced number of blind decodings of the search space set based at least in part on the reduced subset of blind decodings for the search space; and
- transmit the control information in a decoding candidate of the reduced number of blind decodings of the search space.

* * * * *